(12) United States Patent
Greenberg et al.

(10) Patent No.: US 9,727,686 B2
(45) Date of Patent: Aug. 8, 2017

(54) METHOD FOR FINDING NON-ESSENTIAL FLIP FLOPS IN A VLSI DESIGN THAT DO NOT REQUIRE RETENTION IN STANDBY MODE

(71) Applicant: B. G. Negev Technologies And Applications LTD., Beer Sheva (IL)

(72) Inventors: Shlomo Greenberg, Omer (IL); Evgeny Paperno, Beer Sheva (IL); Yossi Rabinowicz, Even Yehuda (IL); Ron Tsechanski, Beer Sheva (IL); Erez Manor, Haifa (IL); Ori Weber, Tel Aviv (IL)

(73) Assignee: B.G. Negev Technologies and Applications LTD., Beer Sheva (IL)

( * ) Notice: Subject to any disclaimer, the term of this patent is extended or adjusted under 35 U.S.C. 154(b) by 174 days.

(21) Appl. No.: 14/758,927

(22) PCT Filed: Jan. 2, 2014

(86) PCT No.: PCT/IL2014/050005
§ 371 (c)(1),
(2) Date: Jul. 1, 2015

(87) PCT Pub. No.: WO2014/106844
PCT Pub. Date: Jul. 10, 2014

(65) Prior Publication Data
US 2015/0339435 A1    Nov. 26, 2015

(30) Foreign Application Priority Data
Jan. 3, 2013 (IL) .......................... 224112

(51) Int. Cl.
*G06F 17/50* (2006.01)

(52) U.S. Cl.
CPC ........ *G06F 17/5081* (2013.01); *G06F 17/505* (2013.01); *G06F 17/504* (2013.01); *G06F 17/5068* (2013.01); *G06F 2217/78* (2013.01)

(58) Field of Classification Search
None
See application file for complete search history.

(56) References Cited

U.S. PATENT DOCUMENTS

| 7,992,125 B2 * | 8/2011 | Chen ............... G06F 17/5022 716/132 |
| 2004/0225978 A1 | 11/2004 | Fan et al. |
| 2008/0201669 A1 | 8/2008 | Weiner et al. |

FOREIGN PATENT DOCUMENTS

| JP | 2010055206 A | 3/2010 |
| KR | 20070055206 A | 6/2007 |

(Continued)

OTHER PUBLICATIONS

T. Bartenstein, "Fault Distinguishing Pattern Generation," ITC Int'l Test Conference, Paper 31.2, 2000 IEEE, pp. 820-828.*

(Continued)

*Primary Examiner* — Leigh Garbowski
(74) *Attorney, Agent, or Firm* — Schwegman Lundberg & Woessner, P.A.

(57) ABSTRACT

The invention relates to a method for reducing the number of flip-flops in a VLSI design that require data retention, thereby eliminating the respective backup cells for those flip flops, the method comprises the steps of: (a) defining one or more criteria for non-essentiality of backup cells! (b) during the physical design stage, analyzing the VLSI design based on said one or more criteria for non-essentiality, and finding those flip-flops that meet these criteria, wherein said analysis is performed at the gate level, independent from any higher level representation of the design; and (c) eliminating from the VLSI design those backup cells for all non-essential (Continued)

flip-flops that meet one or more of said criteria for non-essentiality, thereby leaving in the design only those backup cells for those flip-flops that do not meet any of said criteria.

21 Claims, 17 Drawing Sheets

(56) References Cited

FOREIGN PATENT DOCUMENTS

| WO | WO-2012010934 A1 | 1/2012 |
|---|---|---|
| WO | WO-2014106844 A1 | 7/2014 |

OTHER PUBLICATIONS

K. Chakravadhanula et al., "Test Generation for State Retention Logic", 17$^{th}$ Asian Test Symposium, 2008 IEEE, pp. 237-242.*

E. Choi et al., "Power-Gating-Aware High-Level Synthesis," ISLPED'08, 2008 ACM, pp. 39-44.*

A. Darbai et al., "Selective State Retention Design using Symbolic Simulation," 2009 EDAA, 6 pages.*

H.-O. Kim et al., "Semicustom Design Methodology of Pwer Gated Circuits for Low Leakage Applications," IEEE Trans. on Circuits and Systems—II: Express Briefs, vol. 54, No. 6, Jun. 2007, pp. 512-516.*

"International Application Serial No. PCT/IL2014/050005, International Preliminary Report on Patentability mailed on Mar. 13, 2015", 4 pgs.

"International Application Serial No. PCT/IL2014/050005, International Search Report mailed Apr. 8, 2014", 4 pgs.

Fried, Guy, et al., "Selective State-Retention power gating (SSRPG)", SSRPG Project, (2009), 20 pgs , no translation of text.

Kim, Suhwan, "Experimental Measurement of a Novel Power Gating Structure with Intermediate Power Saving Mode", Proceedings of the 2004 International Symposium on Low Power Electronics and Design, 2004. ISLPED '04, (2004), 20-25.

Lustig, Tomer, et al., "Formal Analysis of SSRPG for Designing Low POwer VLSI Components", Ben Gurion University: Department of Electrical and Computer Engineering, (2012), 21 pgs.

Manor, Erez, "Seminar Invatation: Formal Analysis for Selective State Retenion Power Gating", [Online]. Retrieved from the Internet: <URL: http://www.ee.bgu.ac.il/html/seminar_page.php?num=187>, (Accessed on: Jul. 1, 2015), 1 pg.

Sheets, Michael Alan, "Chapter 3: System State", Standby Power Management Architecture for Deep-Submicron Systems, EECS Department, University of California, Berkeley Technical Report No. UCB/EECS-2006-70, (May 19, 2006), 23-43.

* cited by examiner

METHOD FOR FINDING NON-ESSENTIAL FLIP FLOPS IN A VLSI DESIGN THAT DO NOT REQUIRE RETENTION IN STANDBY MODE

PRIORITY APPLICATIONS

This application is a U.S. National Stage Filing under 35 U.S.C. 371 from International Application No. PCT/IL2014/050005, filed on 2 Jan. 2014, and published as WO WO/2014/106844 on 10 Jul. 2014, which application claims the benefit under 35 U.S.C. 119 to Israeli Application No. 224112, filed on 3 Jan. 2013; which applications and publication are incorporated herein by reference in their entirety.

FIELD OF THE INVENTION

The invention relates in general to the field of VLSI design. More specifically, the invention relates to the field of minimizing power consumption in a mobile VLSI design.

BACKGROUND OF THE INVENTION

System on a Chip technology (SoC) is widely used in mobile devices such as cellular phones, media players, tablet PCs, etc. Each of such chip integrates hundreds of thousands to several millions elements, many of them are bi-stable components (i.e., flip flops) that are capable of retaining binary states.

During normal operation, such a chip consumes a significant amount of energy from the device battery, while a significant portion of this energy consumption results from the large number of flip flops. A continuous operation of the chip in a normal manner typically results in a very fast battery exhaustion. Typically, a mobile device is non active (for example in standby state) most of the time, and during this time most of the energy consumption is due to static power leakage. Furthermore, in today's deep sub-micron manufacturing processes, 45 nm and below, static power consumption has become even a more dominant factor, impeding further advancement of SoC designs.

Power gating (PG) is one of the common techniques for reducing power consumption resulting from static leakage in a system on chip for mobile devices. A high PG efficiency is obtained due to a complete disconnection of specific regions of the chip from the power supply during a standby state. However, a major drawback of using the PG technique is the complete loss of the circuit state which is intolerable. Therefore, in order to restore the state of the circuit back to its state prior to standby state, significant additional time and dynamic power is required. This drawback is unacceptable in many applications.

To overcome the above drawback of the PG technique, a State Retention Power Gating approach (SRPG) has been developed. According to this approach, the state of the design is retained during standby by using a low-leakage state-retention memory cell (so called SRPG cells) for each and every flip-flop (FF) in the power-gated regions. The SRPG cells remain powered during standby, consuming relatively low energy, and in such a manner the state retained by those cells enable restoration of the design state to its previous state (i.e. the state before power down).

The main disadvantage of retaining the entire flip flops data is the area increase due to the additional SRPG cells. Using SRPG technique to retain the entire flip flops data results in an increase of 5% to 10% in the area of the chip. This technique also significantly increases the complexity of the physical design. Moreover, the excessive number of SRPG cells also increases the static power consumption in standby state, relative to the PG implementation.

Sheets, (http://www.eecs.berkeley.edu/Pubs/TechRpts/2006/EECS-2006-70.pdf) (chapter 3 of the document), suggests that a subset of storage elements with insignificant values can be determined by analyzing their read and write patterns across a set of possible states (referred to as checkpoints in his work) when the system is stationary. If a storage element is never read again after a certain checkpoint, or it is rewritten before it is next read, its content can be safely discarded. Sheets further suggests classifying all the states into two groups: persistent state and temporary state for each checkpoint. Sheets presents a general framework to reduce the state maintenance requirements during sleep mode. The framework is applied to Finite State Machines and microprocessors. Partitioning the system into subsystems with individually power domains allows fine-grain control of the power for portions of the chip (sub designs).

Sheets' approach can't be easily applied to a large design, since it is not practical to fully represent a typical design, which is composed of several sub designs, by a single FSM. Moreover, the power management proposed by Sheets relates to power gating of a sub design rather than a single flip-flop. This leads to low granularity and less efficient power management (i.e. in case one of the flops in a sub design needs retention then the whole sub design flops and the related logic should be retained).

Bashari et al., in their paper "Selective State Retention Design Using Symbolic Simulation" (in Design, Automation & Test in Europe Conference & Exhibition, pp. 10054-10059, 20-24 Apr. 2009) suggest using a formal model checking technique called Symbolic Trajectory Evaluation (STE) to check the design behavior. However, this approach is case specific since a fundamental requirement to this approach is the construction of sets of properties for each functional unit in question. Moreover, this approach performs analysis at the unit level, and not at the flip flop level, and no quantification for the retention flip flops reduction is presented.

It is therefore an object of the present invention to overcome said significant static power consumption obstacle, which impends the development of mobile devices that are based on CMOS 45 nm or below technology.

It is another object of the present invention to provide a state retention in a system on chip which provides a significant saving of power consumption (i.e., battery energy) compared to the existing SRPG approach.

It is still another object of the present invention to provide a significant saving of area in a system on chip compared to the SRPG approach.

It is still another object of the invention to enable a full recovery of the system on chip upon power resumption following a standby state.

It is still another object of the invention to provide a method for saving area and power in a system on chip, which is entirely independent of the software which will eventually run on the chip.

It is still another object of the invention to provide said method which is generic, and is independent of the VLSI specific design.

It is still another object of the invention to provide a method for significantly reducing the physical design (back-end) implementation complexity when applying state retention.

It is still an object of the present invention to provide all said advantages in an efficient and low cost manner, which is performed during the design stage.

Other objects and advantages of the invention will become apparent as the description proceeds.

SUMMARY OF THE INVENTION

The invention relates to a method for reducing the number of flip-flops in a VLSI design that require data retention, thereby eliminating the respective SRPG cells (hereinafter also referred to as "backup cells") for those flip flops, the method comprises the steps of: (a) defining one or more criteria for non-essentiality of backup cells; (b) during the physical design stage, analyzing the VLSI design based on said one or more criteria for non-essentiality, and finding those flip-flops that meet these criteria, wherein said analysis is performed at the gate level, independent from any higher level representation of the design; and (c) eliminating from the VLSI design those backup cells for all non-essential flip-flops that meet one or more of said criteria for non-essentiality, thereby leaving in the design only those backup cells for those flip-flops that do not meet any of said criteria.

Preferably, one of said criteria is a "write before read" criterion, defining a flip-flop on which, following recovery from a standby state, the first operation which is performed is a write operation assigning to the flip-flop a new value, given that this write operation takes place before any read operation is performed.

Preferably, one of said criteria is a "constant value" criterion, defining that upon entering a standby state a flip-flop always gets the same value.

Preferably, one of said criteria is a "never read" criterion, defining that upon power resumption following recovery from a standby state, the respective flip-flop value is never read.

Preferably, said analysis stage uses a Binary Decision Diagram representation to reduce computational complexity and memory requirements, and wherein said criteria for non-essentiality are mapped to BDD traversals.

Preferably, said VLSI design is for use in a low-power mobile device.

Preferably, the analysis stage involves parsing said design into groups of master-slave flip flops whereby a master flip flop drives one or more slave flip-flops, and performing the analysis individually on each group, and independently from other groups.

Preferably, the method comprises the steps of: (a) producing a gate level representation of the VLSI design; (b) parsing the design into groups of master-slave flip flops; (c) extracting input equations for each flip flop in the design; (d) analyzing said input equations with respect to a post-standby phase upon power resumption, with respect to a pre-standby phase upon power down, or with respect to both said phases, thereby finding those non-essential flip-flops that meet said one or more criteria for non-essentiality; and (e) eliminating from the VLSI design those back up cells for all said non-essential flip-flops that meet one or more of said criteria for non-essentiality.

Preferably, the analyzing step is performed either by use of a formal verification approach, or by use of an algorithmic based approach.

Preferably, the analysis with respect to a post standby phase analyzes all the pairs of master-slave flip flops in the design, and determines from said pairs those flip flops that adhere to said one or more of criteria for non-essentiality.

Preferably, one master flip flop may be common to plurality of said pairs.

Preferably, the analysis with respect to a post standby phase determines those flip flops that meet either the "write before read" criterion or the "never read" criterion.

Preferably, the analysis with respect to a pre standby phase determines those flip flops that meet the "constant value" criterion.

Preferably, said criteria comprise a "write before read", "never read" and constant value, and said analysis is verified by: (a) constructing a BDD graph from the respective input equation separately for each flip flop in the design; (b) traversing the BDD based on initial standby state values known in advance for the respective flip flop; (c) for said "constant value" criterion, checking all the sub branches of the BDD to verify whether all their leaves contain the same value, and in the affirmative case, defining the flip flop as a non-essential flip flop; (d) for said "write before read" criterion, checking the following condition for all the sub branches: (1) if the BDD graph traversal for a master flip-flop ends with a branch not containing its own master flip-flop output value with no dependency on its own output, concluding that a write operation is detected; and (2) if the BDD graph traversal for all slave flip-flops ends with a branch not containing the master flip-flop output, concluding that no read operation is detected; and (3) when both said conditions are met, a 'write before read" has occurred and therefore concluding that the master flip flop is a non-essential flip flop; (e) for said "never read" criterion, checking the following condition for all the sub branches: (1) if the BDD graph traversal for all slave flip-flops ends with a branch not containing the master flip-flop own output, for all following cycles exiting standby, concluding that no read operation is detected and, concluding that the flip flop is a non-essential flip flop; (f) if the examined flip-flop does not adhere to any of said criteria, concluding that the flip flop is an essential flip flop; and (g) repeating steps a-f separately for all the flip flops in the design, thereby classifying all the flip-flops in the design to either essential or non-essential flip-flops.

Preferably, the write before read criterion is verified by: (a) selecting a master-slave flip flop pair; (b) monitoring said pair of flip flops immediately following power resumption and exiting from standby, to determine whether a master flip flop has been read by any one of the slaves that are driven by this master flip flop; (c) if upon power resumption it is found that a master flip flop has been read by any one of the slaves that are driven by this master flip flop, before any write operation to the master flip flop is detected, a conclusion is made that the "write before read" criterion has not been met; (d) if following an exit from standby state and upon power resumption, both said "write operation" and "read operation" have been detected, a conclusion is made that the "write before read", criterion has not been met; (e) if, however, a write to the master flip flop is detected before any read from the master flip flop by any one of its slaves is detected, a conclusion is made that the "write before read" criterion has been met.

Preferably, said method of the invention is generic and irrespective of the VLSI specific design.

Preferably, the formal verification approach applies a Bounded Model Checking technique, and wherein said criteria for non-essentiality are translated to assertions.

Preferably, an analysis of said assertions by a Bounded Model Checking technique is simplified by employing clock-gating logic utilizing common synthesis tools.

Preferably, said write operation is detected when finding that the cell is assigned a new value that is independent of the cell current value.

Preferably, the method involves (a) parsing the design into master slave groups, whereby each group comprises of one master flip flop and one or more slave flip flops driven by it; and (b) simplifying the "write before read" and "never read" criteria analysis.

Preferably, said stage of determining the input equation uses common synthesis tools and limited specific standard cell library to generate a universal gate representation of the design.

DETAILED DESCRIPTION OF PREFERRED EMBODIMENTS

Figure 1:
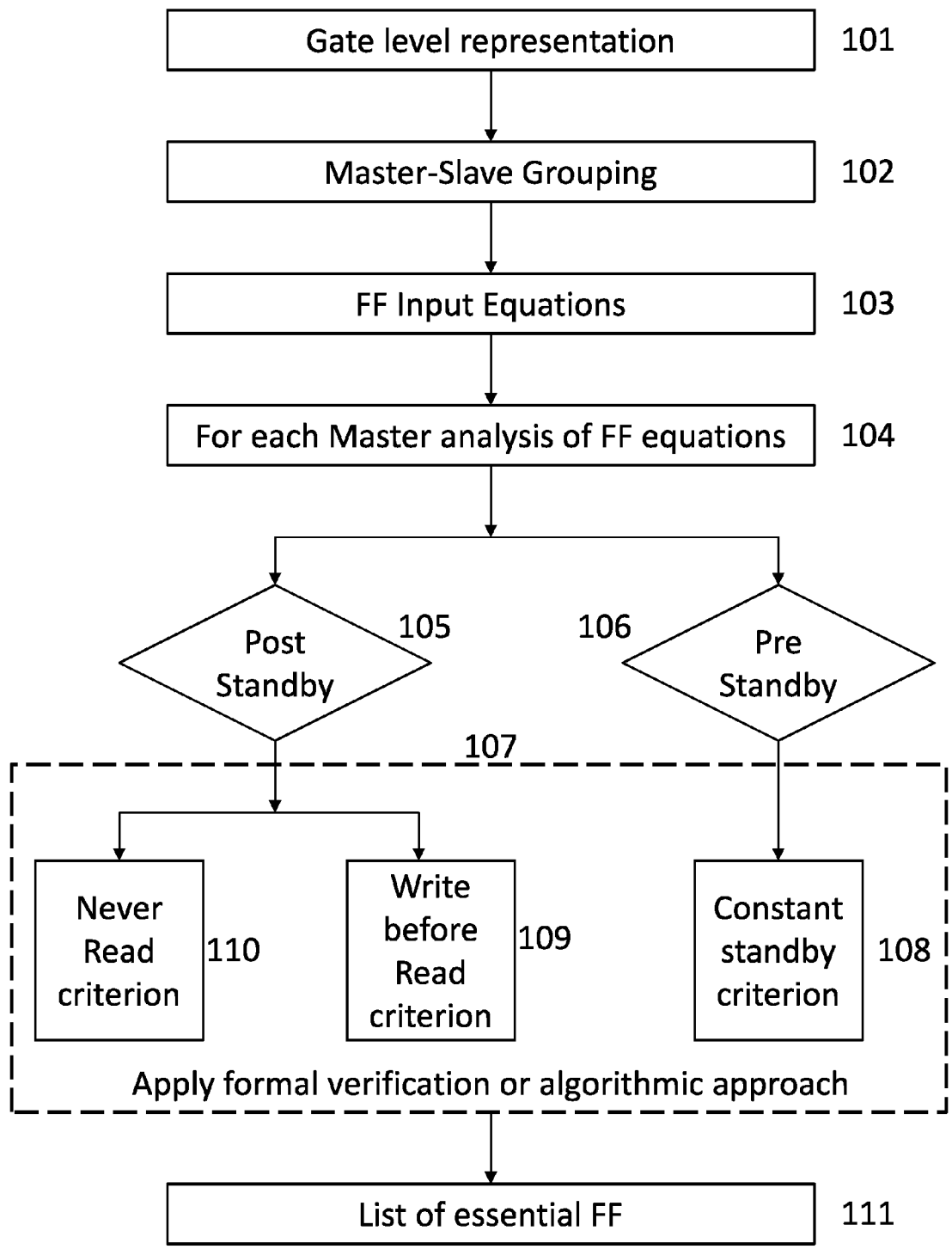
FIG. 1 generally illustrates a flow diagram form which the method of the present invention.

As noted above, and in order to provide full recovery from a standby state after power down, the SRPG implementation of the prior art requires the provision of a backup cell for each and every bi-stable component (flip flop) in the chip. As a result, a single chip may include millions of backup cells. Beyond the costs involved in such a structure, this mass number of backup cells causes a significant increase (typically 5%-10%) in the chip area, and furthermore, all the backup cells, when used to retain the states of all the flip flops on the chip, consume a significant amount of the battery energy. For example, in a CMOS 28 nm the retaining of the 60,000 flip flops consumes 2.2 mW. It has been found that the present invention can reduce this power consumption to about 0.08 mW (i.e., 96% of power reduction).

The inventors of the present invention have found that the number of backup cells in a system on chip can be significantly reduced (i.e. about 80% of the flip flops in a typical design were found to be non-essential flip flops), without impairing the capability of the chip to restore its state prior to the entry into a standby state. More specifically, the present invention determines for each specific design those flip flops that are not essential to the process of retaining the system state. For those non-essential flip flops there is no necessity to provide a backup cell, and those cells are eliminated from the design. Therefore, the invention relates to a "Selective State Retention Power Gating" (SSRPG) approach, which selectively chooses the flip flops which do require retention and therefore provides a very significant saving in both area and power consumption, compare to the prior art.

The method of the invention determines a subset of flip flops that are essential for maintaining an appropriate system recovery upon power resumption when exiting from standby state. All the other flip flops are considered as non-essential in terms of the system state retention.

According to the present invention, one or more "criteria for non-essentiality" are defined. The method of the invention inspects all the flip flops of the design to determine whether they meet any of said criteria for non-essentiality. Those flip flops that are found to meet one or more of these criteria are defined as "non essential flip flops", and can be provided within the design without a state retention cell.

The inventors have found that at least three criteria can be applied for determining those non-essential flip flops within the design, i.e., those flip flops that do not need backup cells:

a. The "Unique Standby Value criterion" (also referred to as the "constant value" criterion): This criterion is based on the observation that there are some flip flops that upon entering standby, get always the same value (either "0" or "1", which is independent of the state transition path leading to the standby. Thus making the flip flop value constant to all cases of standby. As will be elaborated, the present invention utilizes the fact that elements that adhere to this criterion have a unique constant value upon entering standby, to implement a pre-set logic that restores the FF value to said constant value upon power resumption (i.e., upon exit from a standby state). As will be shown, the additional pre-set logic can be easily implemented using the existing design's system reset.

b. The "Write Before Read" (WBR) criterion: This criterion is based on an analysis of the flip flop value propagation along the data-path. Based on this criterion the method of the invention looks for all flip flops that after power resumption are first written, before their value is next read. Those flip flops, which adhere to the write-before read criterion, do not require retention and therefore are considered as non-essential. The process for determining those flip flops involves partitioning of the design to master-slave flip flop pairs while a master flip flop may drive one or more slave flip flops.

c. The "Never Read criterion": refers to the case in which some of the flip flops are never read again upon power resumption. The process of the invention for determining those flip flops is also based on the partitioning of the design to master-slave flip flop pairs, while a master flop may drive one or more slave flip flops.

Hereinafter, the term "non-essential flip flop" (N-FF) relates to a flip flop which according to the present invention does not need a backup cell. Even though a backup cell is not provided, this will not impair the operation of the design after power resumption. The object of the method of the present invention is to identify all the non-essential flip flops in the logic design, and eliminate the need for backup cells for those flip flops.

The term "essential flip flop" (E-FF) relates to those flip flops which do not adhere to any of the said criteria, and therefore needs retention by additional backup cells (i.e., SRPG cells).

FIG. 1 depicts a flow diagram which generally illustrates the method of the present invention. In step 101 a gate level representation of the circuit is provided. In step 102, the logic circuit design is parsed into groups of master-slave flip flops. A "group" is defined as a collection which comprises one master flip flop and one or more other slave flip flops. The master flip flop directly drives the connected slaves flip flops (through a possible combinational logic), According to the present invention, each logical connection between a master FF and a slave FF is defined as a pair. Therefore, a group typically contains several pairs, while one master flip flop is common to a plurality of pairs. Typically, a single circuit logic includes plurality of groups. In step 103, the input equations for each FF are determined. Then, an analysis of said input equations is made with respect to each master FF. Preferably the analysis is performed with respect to a post-standby phase—105 of the circuit, and with respect to a pre-standby phase of the circuit. The inventors have found that flip flops that meet said Write Before Read (WBR) criterion—109, and said Never Read criterion 110 can be determined while performing the post standby analysis 105, and the flip flops that meet said Constant Value criterion can be found by performing said pre-standby analysis 106. It should be noted that although the invention may apply only a portion of said three criteria (Constant 108, WBR 109, and Never Read 110), the best results are expected from utilizing all said three criterions while determining the non-essential and essential FFs. The discussion hereinafter will therefore assume using all said three criteria.

The inventors have found two separate approaches (107) for the determination of those non-essential and essential flip flops (N-FFs and E-FFs respectively) of the logic circuit. A first approach for said determination will be referred herein as "the formal verification approach", and the second approach will be referred herein as "the algorithmic based approach" (or briefly Algorithm Approach). These two approaches will be discussed in more detail hereinafter.

The results of the method described in FIG. 1 is a list of non-essential flip flops—111 of the circuit design, for which the provision of a power maintaining and backup cells is unnecessary, or alternatively a list of the essential flip flops for which the providing of a power maintaining and backup cells is mandatory in order to enable full recovery of the circuit upon power resumption on exiting from the standby state. It should be noted that the finding of essential flip flops, or of non-essential flip flops is equivalent, as the combination of said these two lists provide the list of the entire flip flops in the design.

Figure 2:
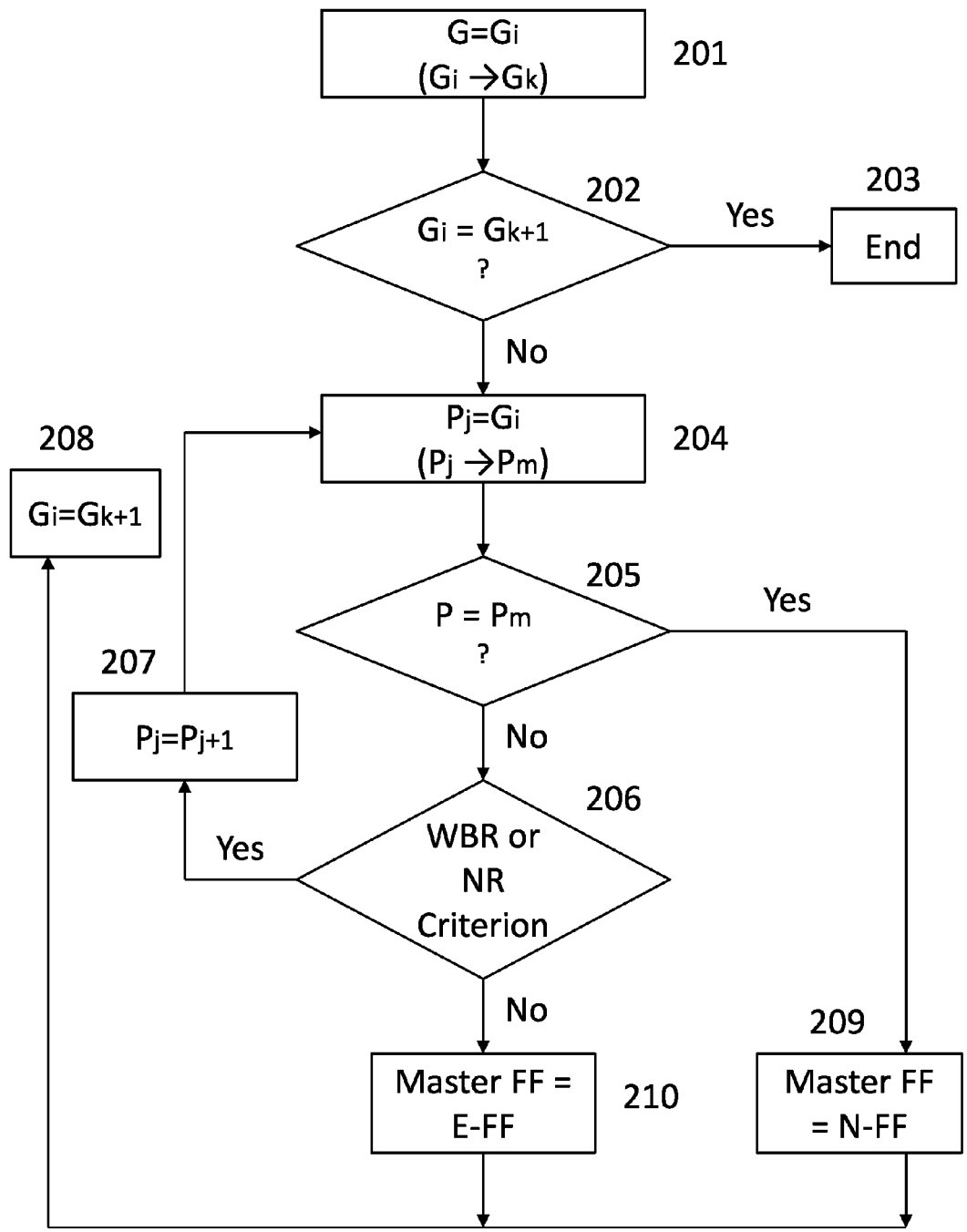
FIG. 2 is a flow diagram which generally describes the post standby process for the determination of non-essential flip flops, according to an embodiment of the present invention.

FIG. 2 depicts a flow diagram which describes the general post standby process for the determination of non-essential flip flops. More specifically, the process analyzes all the pairs of master-slave flip flops in the circuit design, and determines from these pairs those master flip flops that are non-essential (the rest of the FFs are considered as essential). In step 201, the process assigns a specific group—Group#1—(from among k groups in the circuit) for verification. In step 202 the system checks whether all the k groups in the circuit have already been checked. Clearly at the beginning of the process the answer in NO, so the process continues to step 204. In step 204, the first pair in the group (out of n pairs) is selected (as noted, each pair comprises one master FF, and one or more slaves FF). In step 205, a verification is made to determine whether the last pair Pn has been reached. At the beginning, the answer is clearly No, so the process continues to step 206, where a the process verifies whether the master FF meets either or both of the WBR and Never Read criteria. If the answer is YES, the process continues to step 207 where the present pair counter $P_j$ is incremented, and the procedure is repeated beginning from step 204, for the next pair in the group. At the end of this loop, if all pairs of the group are checked, while all the pairs meet either or both of the Never Read and WBR criteria of step 206, the common master FF of this group is declared at step 209 as a non-essential FF (N-FF). On the other hand, if one of the pairs in the group are found not to meet either of the WBR or Never Read criteria, the respective master FF is declared in step 210 as an essential flip flop (E-FF). In any case, after the classification of the master flip flop into either E-FF or N-FF, the group counter $G_i$ is incremented in step 208, and the verification is performed with respect to the next group (i.e., determination whether the next master FF is essential or not).

Figure 3:
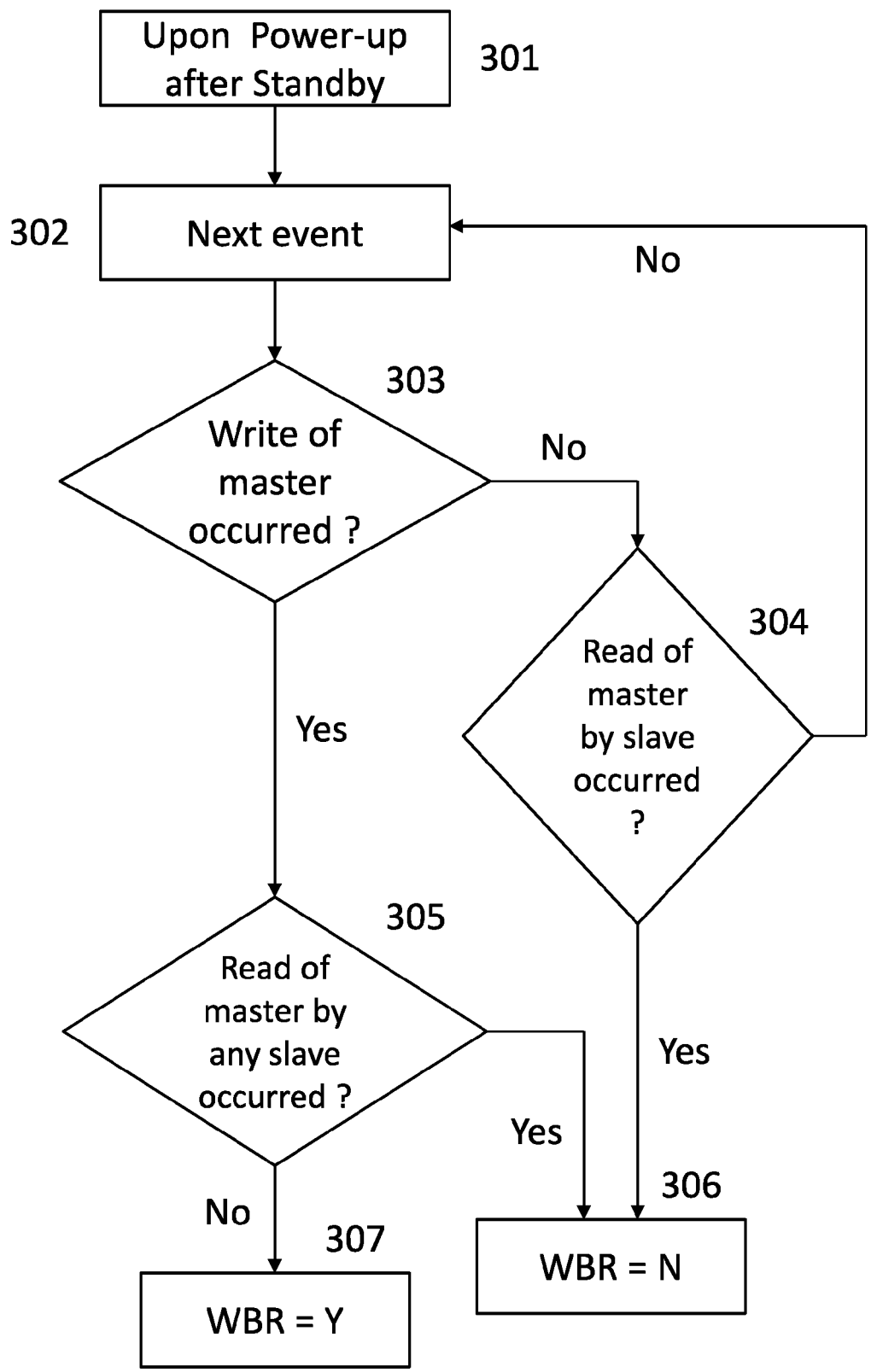
FIG. 3 generally illustrates how a determination is made whether a master flip flop meets the "write before read" criterion or not.

The flow diagram of FIG. 3 illustrates how a determination, as to whether a master FF meets the WBR criterion or not, is done (step 206 of FIG. 2). The procedure begins at step 301 where the pair is checked at the time of exiting standby state after power resumption. In step 302, the next event is monitored. In step 303, a verification is performed as to whether a Write event to the master FF has been occurred. If the answer in step 303 is Yes, the procedure continues to step 305 in which a verification is made to check as to whether a Read operation is made by the slave, i.e., checking if the change of the output of the master FF has been transferred to the slave, or not. If the answer at the verification of step 305 is No, a conclusion is made at step 307 that the WBR criterion has been met. If, however, the Write event (as the first event after exiting standby state) of the master FF at step 303 has not occurred, but a Read operation of the master FF by the slave FF has occurred in step 304, a conclusion is made in step 306 that the WBR criterion has not been met. Similarly, if it has been found in step 305 that a Read of the master FF by the slave FF has occurred at step 305, and this Read has occurred together with a Write event to the master in step 303, a conclusion is made that the WBR criterion has not been met. Finally, if no Write at the master is determined at step 303, and no Read of the master is determined at step 304, the procedure returns to step 302, to monitor the next event, as no conclusion can yet be made.

Figure 4:
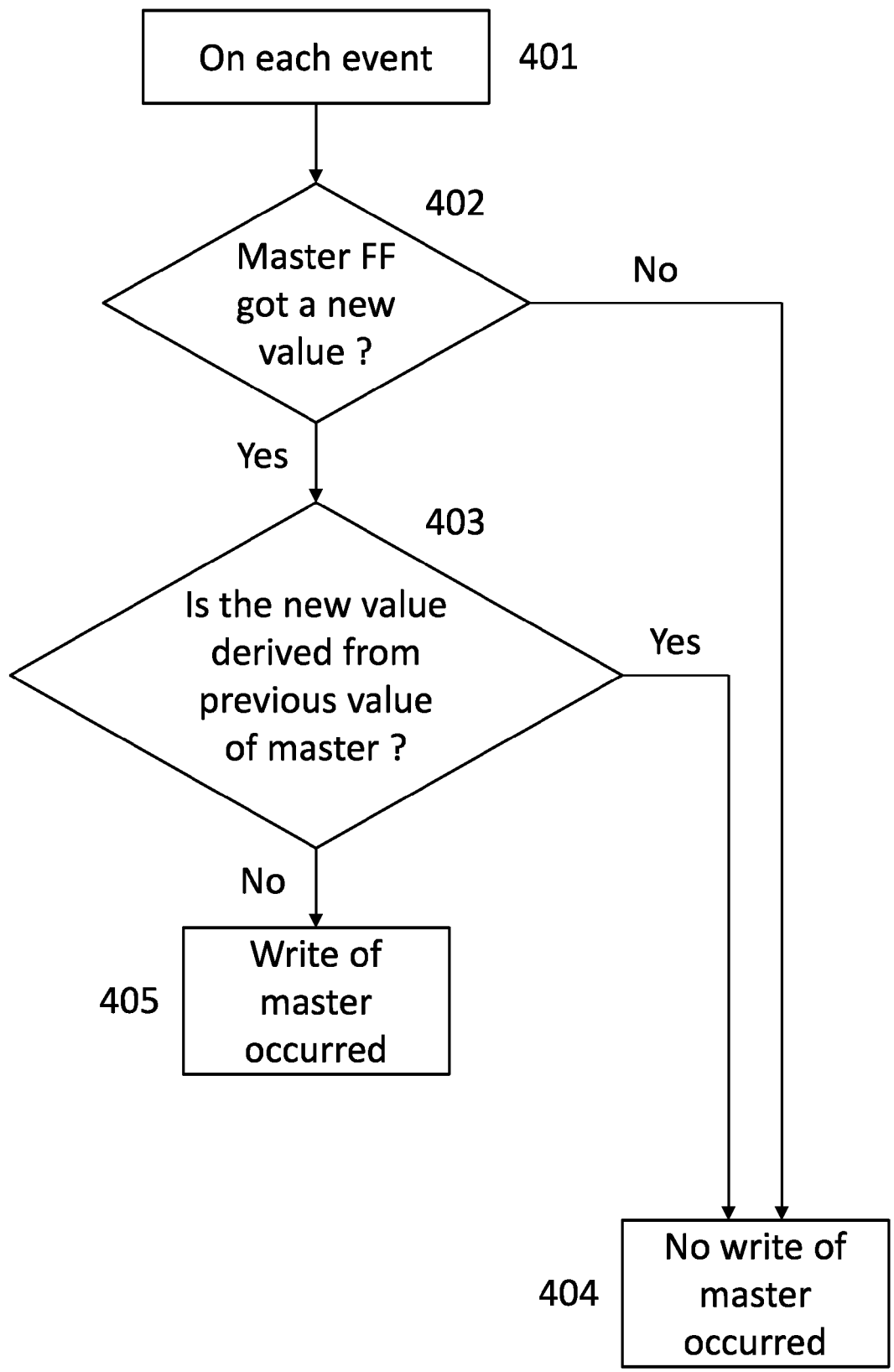
FIG. 4 is a flow diagram which explains the meaning of a Write event at a master FF.

FIG. 4 shows a flow diagram which explains the meaning of a Write event at the master FF, as in step 303 of FIG. 3. In step 401, each event, specifically, a write operation to the master, is monitored. At step 402, a verification is made as to whether the master FF has got a new value. In step 403, a verification is made as to whether the new value of the master FF was derived from a previous value of the same master FF. If the answer to said latter verification is negative, a conclusion is made that a Write to the master has occurred. Otherwise, if it is determined at step 403 that the new value of the master has been derived from a previous value of the same master FF, or the verification at step 402 shows that the master FF has not got a new value, a conclusion is made at step 404 that a Write operation has not been occurred to that master.

Figure 5:
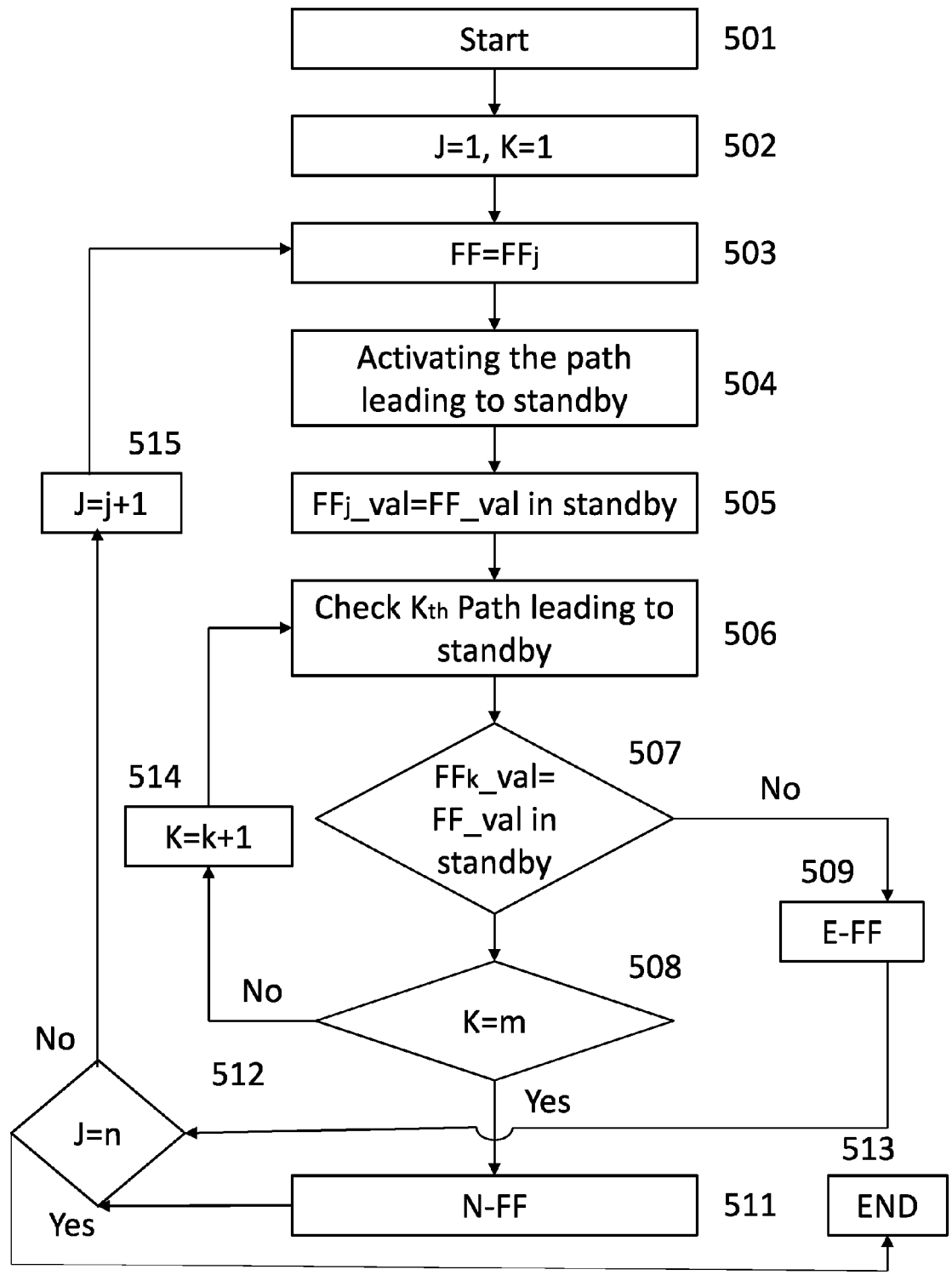
FIG. 5 generally illustrates the process for determining those non-essential flip flops that meet the "Constant Value" criterion.

FIG. 5 generally illustrates the process for determining those non-essential flip flops that meet the "Constant Value" criterion. More specifically, the process of FIG. 5 finds all the flip flops in the circuit that always receive a same specific value while entering a standby state upon power down. The analysis of FIG. 5 is performed only for the formal verification approach. For the algorithm based approach, the analysis will be described later with respect to FIG. 10. The process begins at step 501. At step 502, the FF index is set to "1" (the process assumes n FFs in the circuit), and the path index is also set to "1" (the process assumes k different paths in the design that lead to the standby state. In step 504, the process activates the $1^{st}$ path that leads to standby, and following this activation the circuit goes to standby state. In step 505 the process sets the value of a temporary variable FF_val_in_STBY according to the output value of said $1^{st}$ flip flop. In step 506 the process activates the $k^{th}$ path that leads to standby (in this specific case, k still equal 1, so the $1^{st}$ path is still active). In step 507 a verification is made whether the output value of the present FF ($FF_k$_val) is equal to the previously stored value of the temporary variable FF_val_in_STBY. If the answer is No, in step 509 the FF is declared as an E-FF, and the process continues to step 515, in order to check the next FF in the circuit. However, if the value in step 507 shows that the value of $FF_k$_val is equal to the previously stored FF_val_in_STBY, the process checks in step 508 if the process reached the last available path m that can lead to standby state. If the answer is Yes (i.e., all paths have been checked, while the FF output value following each and every of said paths is always the same), this $j^{th}$ FF is concluded to be a non-essential FF (N-FF)—in step 511. Otherwise, if the answer in step 508 is No (i.e., that the $k^{th}$ is not yet the last path), the $k^{th}$ index is incremented in step 514, and the process continues to check the next path leading to standby, and the loop of steps 506, 507, and 508 (or optionally 509) repeats. Following the conclusion of step 511 or step 509, the process checks in step 512 whether $FF_j$ index is equal to the maximum number 11 of flip flops in the circuit. If the answer is No, the $FF_j$ index is incremented in step 515, leading the process to check the next FF in the circuit. However, if the answer in step 512 is Yes (i.e., all the flip flops have already been checked), the process ends in step 513.

Figure 6:
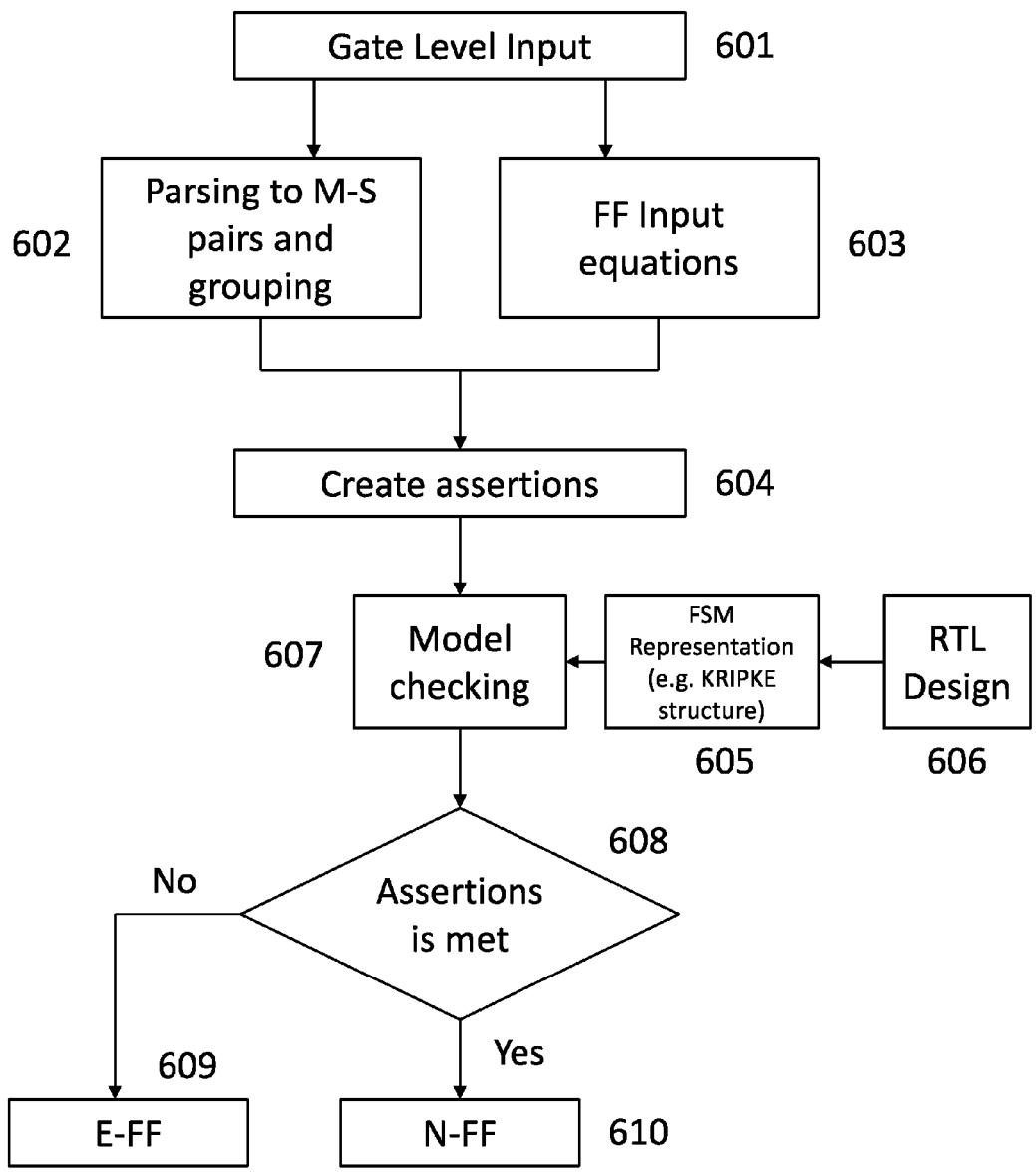
FIG. 6 describes in some detail the Formal Verification approach.

FIG. 6 describes in more detail the Formal Verification approach (the first option of step 107 of FIG. 1) for determining the non-essential flip flops of the design, according to a first embodiment of the invention. The input to the process described in FIG. 6 is the gate level representation—601 of the circuit design. In step 602, the design is parsed to plurality of master-slave pairs. A master flip flop may be common to plurality of slaves, therefore it may be included within several pairs. All the pairs relating to the same master flip flop are grouped together, such that they belong to the same group. In step 603, which is performed essentially in parallel to step 602, the input equations for each flip flop in the circuit are determined. In step 604 assertions with respect to each flip flop are created, more specifically, and then the—three criteria (WBR, Never Read, and Constant) are translated into appropriate assertions. The manner of defining these assertions will be elaborated hereinafter. In step 606 the RTL design is converted to FSM (Finite State Machine) representation, for example, the Kripke structure. In step 607, a model checking is performed, i.e., a verification whether a certain assertion is satisfied or not. In step 608 the process further verifies whether t those assertions are satisfied according to the analyzed RTL design. In the affirmative case, the respective FF is concluded to be a non-essential flip flop—in step 610. Otherwise, if the assertions in step 608 are found to be wrong, the respective FF is concluded to be an essential flip flop. The procedure described in FIG. 6 is performed with respect to all the flip flops in the design.

Figure 7:
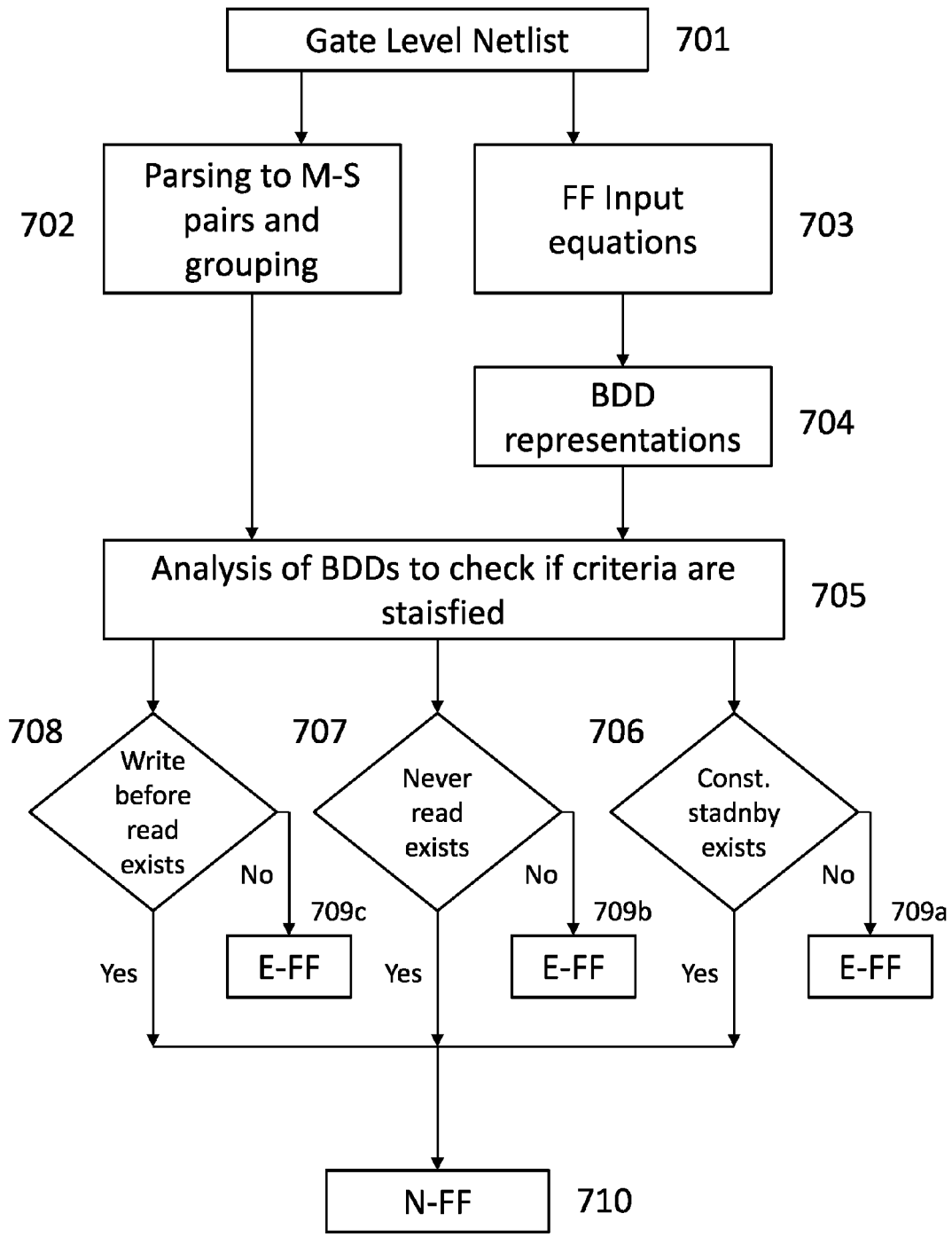
FIG. 7 describes in some detail the Algorithm based approach.

FIG. 7 describes in more detail the Algorithm based approach (the second option of step 107 of FIG. 1) for determining the non-essential flip flops in a given design, according to a second embodiment of the invention. The input to the process described in FIG. 7 is again the gate level representation 701 of the design. In step 702, the design is parsed to plurality of master-slave pairs. A master flip flop may drive plurality of slaves, therefore it may be included within several master-slave pairs. All the pairs relating to the same master flip flop are grouped together, such that they belong to the same group. In step 703, which is performed essentially in parallel to step 702, the input equations for each flip flop in the design are determined. In step 704 BDD (Binary Decision Diagram) representations of the design are created for each flip flop. In step 705 all the BDDs are analyzed to verify whether any of the criteria (WBR, Never Read, and Constant) are met. If none of the criteria are met, the procedure concludes that the respective flip flop is essential.—in steps 709a, 709b, and 709c respectively. Otherwise, if any of the criteria (WBR, Never Read, and Constant) is met, the procedure concludes that the respective flip flop is essential—in step 710.

Figure 8:
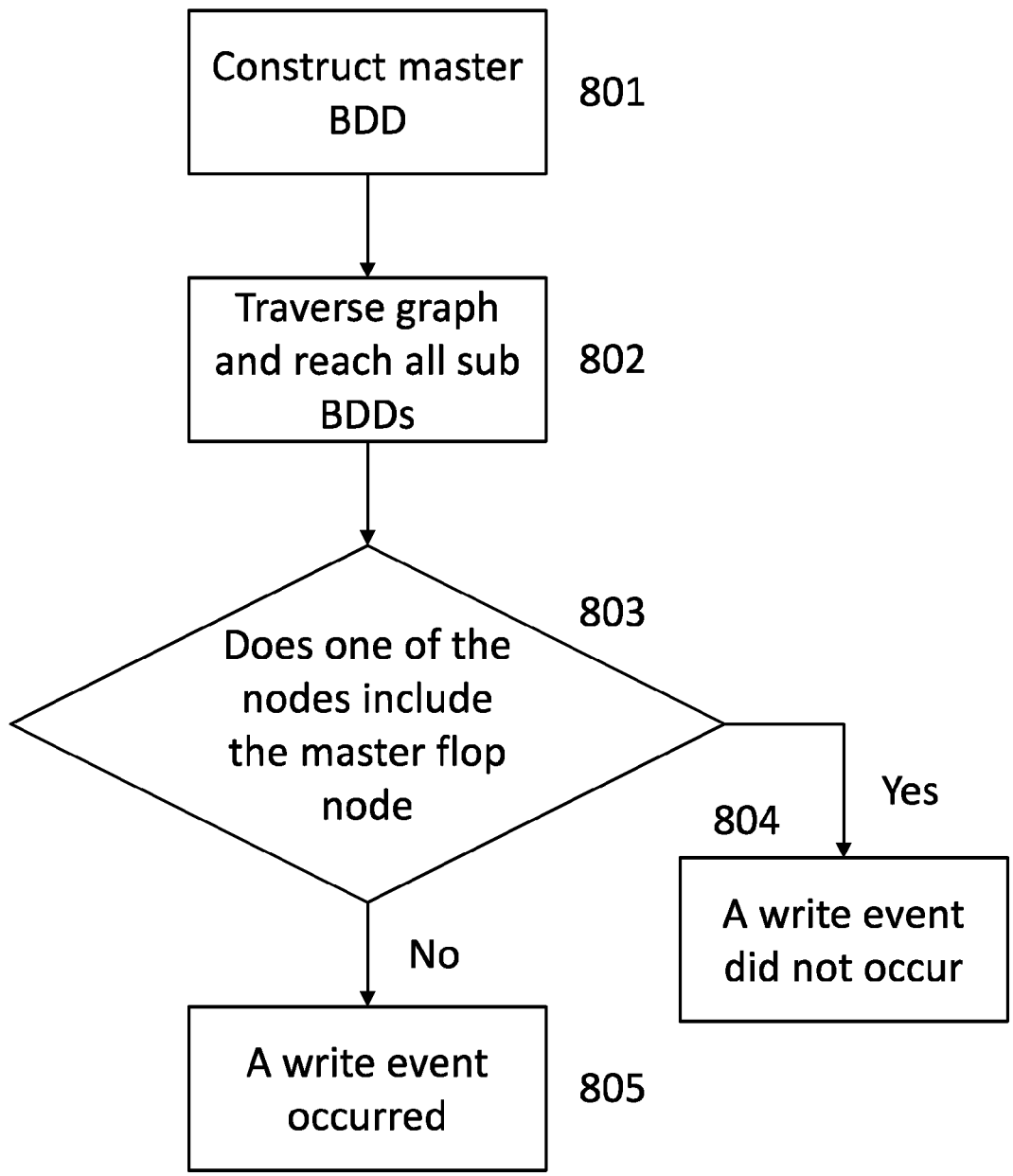
FIG. 8 describes in some detail how a detection of a write event is performed based on the algorithm (BDD) approach.
Figure 9:
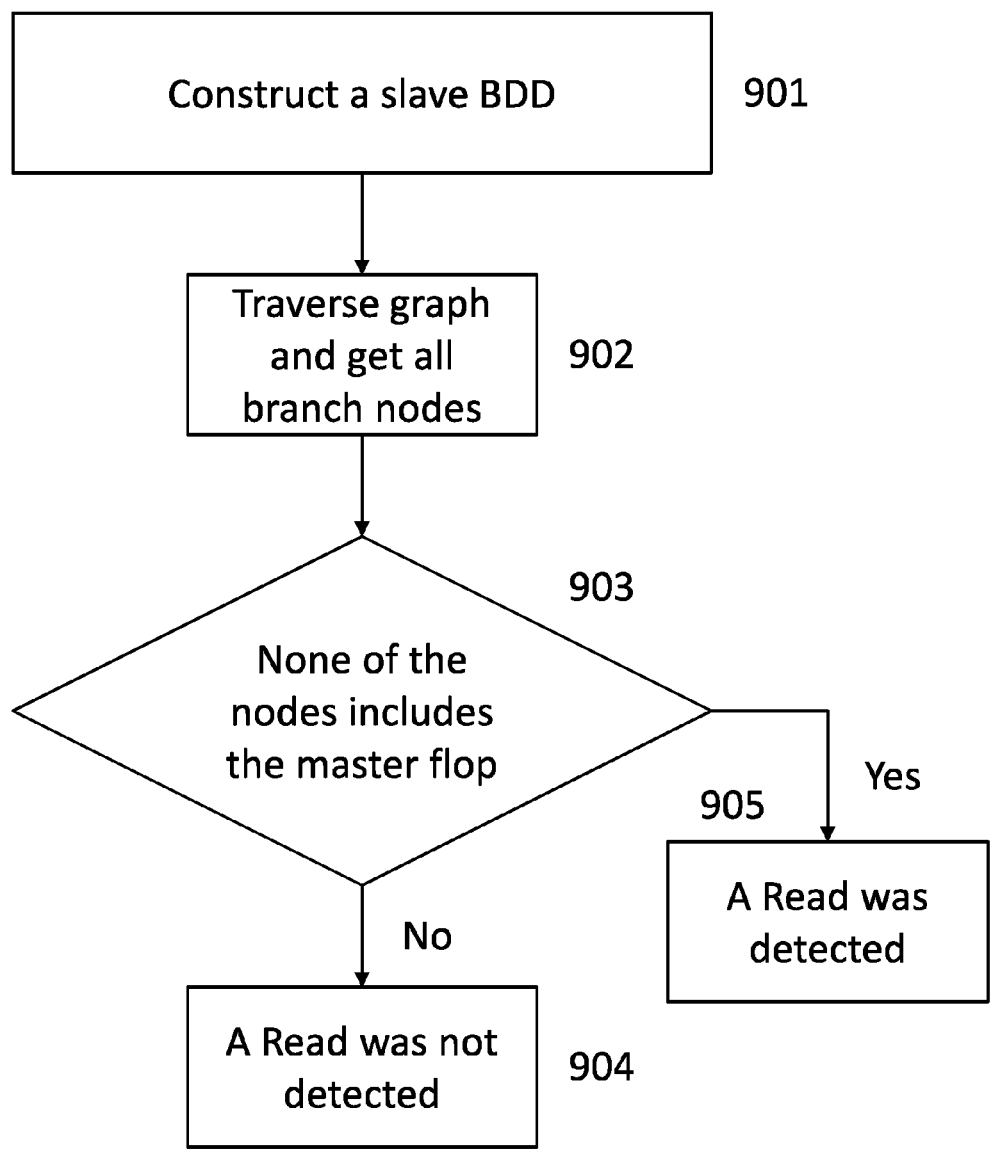
FIG. 9 describes in some detail how a read event is performed based on the algorithm (BDD) approach.
Figure 10:
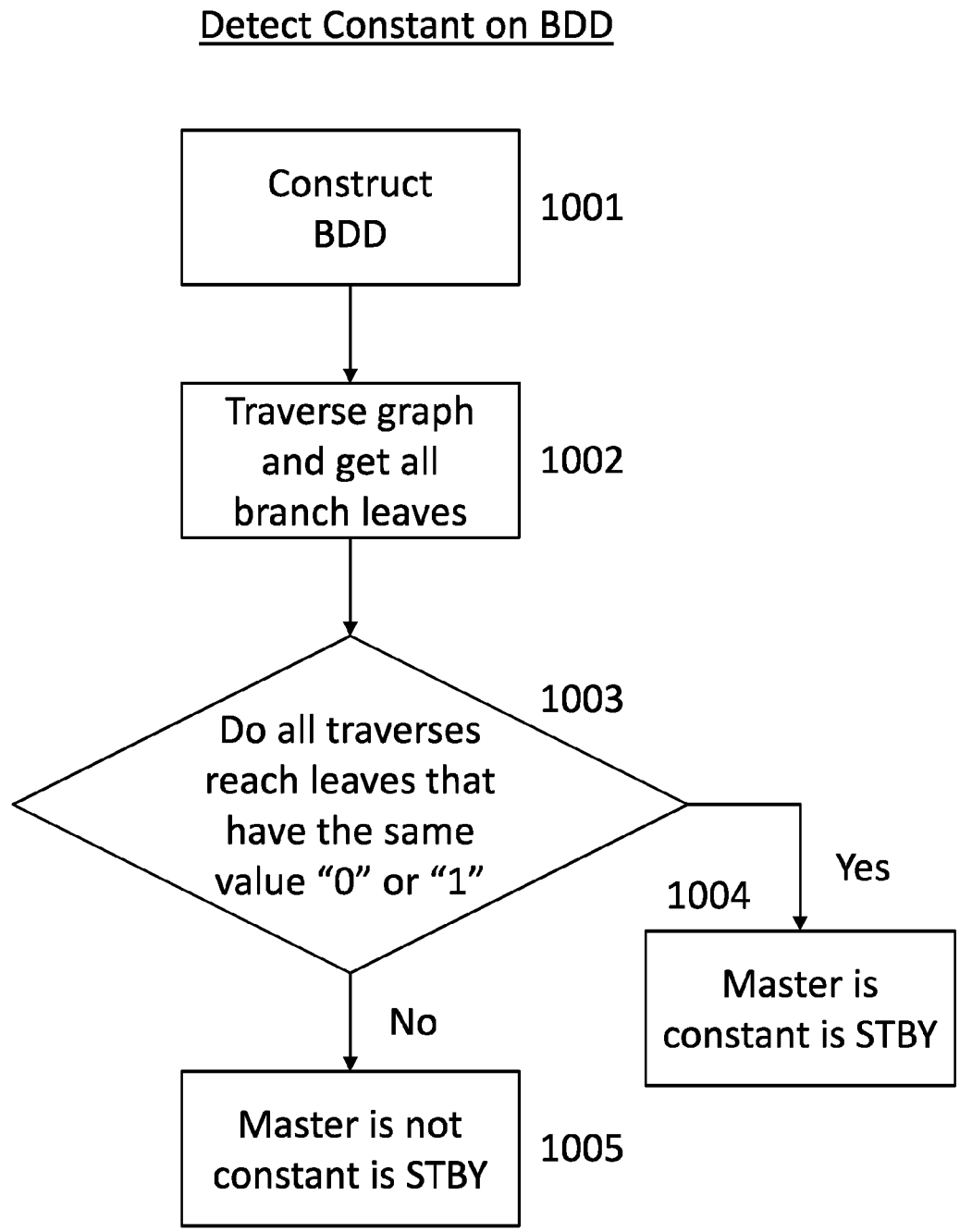
FIG. 10 describes in some detail how a determination of a flip flop that meets the constant criterion is performed based on the algorithm (BDD) approach.

A more detail explanation by which the algorithm approach (BDD) is performed is described in FIGS. 8-10. FIG. 8 describes in more detail how step 303 (detection of a write event) of FIG. 3 is performed. The analysis of FIG. 8 is performed for each master flip flop in the design. In step 801, a BDD representation for the master flip flop is constructed from the master input equation, i.e., the flip flop D input. In step 802, the BDD graph is traversed based on the initial standby state known flip flop values. In step 803, all sub branches (sub BDDs) are checked to find whether one of their nodes contain the master flip flop. If YES, a write event is not detected. On the other hand, if NO, a write event is detected.

FIG. 9 describes in more detail how step 305 (detection of a read event) of FIG. 3 is performed. The analysis of FIG. 9 is performed for each slave flip flop which is connected to the inspected master. In step 901, a BDD representation for the slave flip flop is constructed using the slave input equation, i.e., the flip flop D input. In step 902, the BDD graph is traversed based on the initial standby state known flip flop values. In step 903, all sub branches (sub BDDs) are checked to find whether one of their nodes contain the master flip flop. If YES, a read event is detected. On the other hand, if NO, a read event is not detected.

FIG. 10 describes in more detail how stage 707 (determination of a flip flop that meets the constant criterion) of FIG. 7 is performed based on the algorithm (BDD) approach. The analysis of FIG. 10 is performed for each flip flop in the design. In step 1001, a BDD representation for the flip flop is constructed using the flip flop input equation, i.e., the flip flop D input. In step 1002, the BDD graph is traversed based on the initial standby state known flip flop values. In step 1003, all sub branches (sub BDDs) are checked whether all their leaves contain the same value. If YES, the flip flop is classified as a non-essential flip flop. On the other hand, if NO, the flip flop is classified as an essential flip flop.

Further Discussions and Examples

A. The Formal Verification Approach

Figure 11:
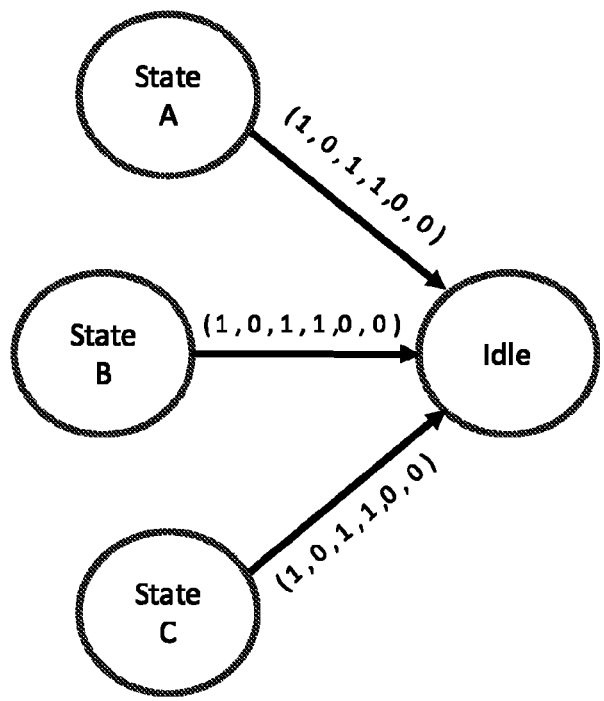
FIG. 11 demonstrates the constant value criterion.

The following discussion relates to the formal verification approach. FIG. 11 demonstrates the "Unique State Value" (the "constant") criterion. The figure shows an example of a system state diagram that consists four states (denoted by A, B, C and Idle). A six elements vector (between brackets) represents the values of six selected flip flops. It can be easily seen that the first and third vector elements always retain the same value when entering the standby state, and therefore satisfy the constant value criterion. Flip flops that adhere to this criterion cannot be considered as N-FFs, and apparently, do need retention. However, the invention suggests utilizing the fact that they have a unique constant value (upon entering standby) and implement a pre-set logic to restore their value upon resumption power. This proposed additional pre-set logic can be easily implemented using the existing design's reset tree.

The WBR criterion is based on an analysis of the flip flop value propagation along the data-path. In this criterion we search for all flops which are either written before their value is next read or never read again upon power resumption. The analysis for extracting those flops is based on partitioning the design to master-slave flop relations whereby a master flop drives one or more slave flops. The input equation for the master flip flop is used to determine if it was written with a new value. The method of the invention checks the dependency of the master flip flop input D on its output Q. In case the input depends on the output Q its values should be saved and thus, retention is needed. The case in which the flip flop is re-written with a value that depends on its previous value is not considered by us as write transaction. On the other hand, if the input D does not depend on its output Q that necessarily means that it has been written. This scenario is defined as Write event ($Y_M$). To determine if the master flop has been read, the process checks all the slaves input equations. In case one of the input equations is dependent on the master output Q, then the process concludes that the master flip flop has been read. This scenario is defined as Read event ($Y_S$).

In order to identify the 'write before read' criteria an event ordering analysis is carried out. The analysis is performed using formal tools by checking the timing of $Y_S$ and $Y_M$ events. There are four possible scenarios: (1) $Y_S$ proceeds $Y_M$; (2) $Y_M$ proceeds $Y_S$; (3) $Y_S$ and $Y_M$ occur together; and (4) neither $Y_S$ and $Y_M$ occur.

The first scenario (when $Y_S$ proceeds $Y_M$) represent 'read before write', meaning a read event is detected by one of the slaves (before any write occurred to the master), and therefore the master flop under test is defined as E-FF (and should be retained).

The case, in which both read and write events are identified in the same time, is not considered as a 'write before read', and thus the master flip flop under test is E-FF. For the remaining scenarios the master flip flop is considered as N-FF. The case in which $Y_M$ is detected before $Y_S$, the master flop adheres to the 'write before read' criteria and is defined as N-FF. If neither read nor write event are detected for all the possible transitions emerging from standby state then, this flip flop adheres to the "never read" criteria and thus is defined as N-FF.

The read-write events $Y_S$ and $Y_M$ are acquired from a given net-list. The following section describes the way to extract the read-write events. The analysis below is given for D type flops whereby D(t)=Q(t+1), i.e. the flop input equation equal to its next state equation.

If $Q_m(t+1)$ for the master under test is independent on its own $Q_m(t)$, that means that a write event $Y_M$ has occurred. Therefore if assigning '0' or '1' to $Q_m(t)$ in the input equation results with the same value $Q_m(t+1)$, a conclusion is made that a write event $Y_M$ has occurred.

To detect a 'read event' $Y_S$ the invention checks the dependency of the slave's input equation on the master $Q_m(t)$. Therefore if assigning '0' or '1' to $Q_m(t)$ in the input equation results with a different value $Q_S(t+1)$, the process concludes that a read event $Y_S$ has occurred.

The formal analysis (FA) according to one embodiment of the invention is a process that uses sophisticated algorithms to conclusively prove or disprove that a design behaves as desired for all possible operating states. The desired behavior is not expressed through a traditional test bench, but rather as a set of assertions. Therefore, the formal analysis procedure does not require traditional user-developed test vectors, and instead it analyzes all legal possible input sequences concurrently and automatically.

Within the formal analysis procedure, properties are the basic units of the Boolean expressions. The properties are formalized statements describing the behavior of the design's elements over time. The design's elements behaviors are expressed by means of a property language, such as System Verilog Assertion (SVA). Commercial FA tools are available from EDA vendors.

Model checking is a formal verification algorithm to determine whether a certain property is satisfied. It is based on the exhaustive exploration of the system's state space.

Figure 12:
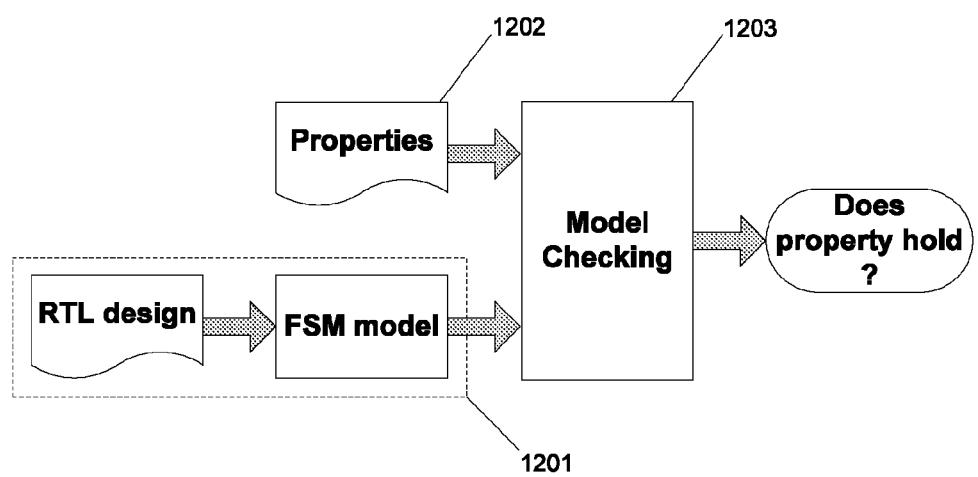
FIG. 12 demonstrates the model checking flow.

FIG. 12 demonstrates the model checking flow. The flow consists of 3 stages, an RTL to FSM stage 1201, properties expression stage 1202, and model checker stage 1203. In stage 1201 the RTL design is converted into an extended FSM representation (such as a Kripke structure). In stage 1202 the required properties are expressed using mathematical assertions language. Finally, in stage 1203 the FSM representation of stage 1201 and the properties of stage 1202 are processed by the model checker 1203, which validates that the given properties are satisfied.

The common representation for formal verification is that of a Kripke structure. A Kripke structure is basically a graph having the reachable states of the system as nodes and state transitions of the system as edges. Each state in the Kripke structure is mapped to a unique group of state variables and each transition in a Kripke structure denotes a change in the value of one or more state variables over time. A Kripke structure also contains the labeling of the states of the system with properties that hold in each state, therefore the design's behavior can be described and analyzed using a Kripke structure.

Figure 13A:
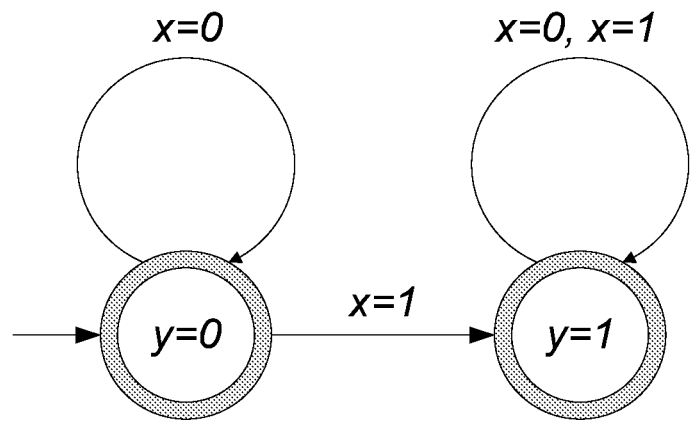
FIGS. 13a-13c demonstrate the mapping of a FSM representation into a parse tree representation.
Figure 13B:
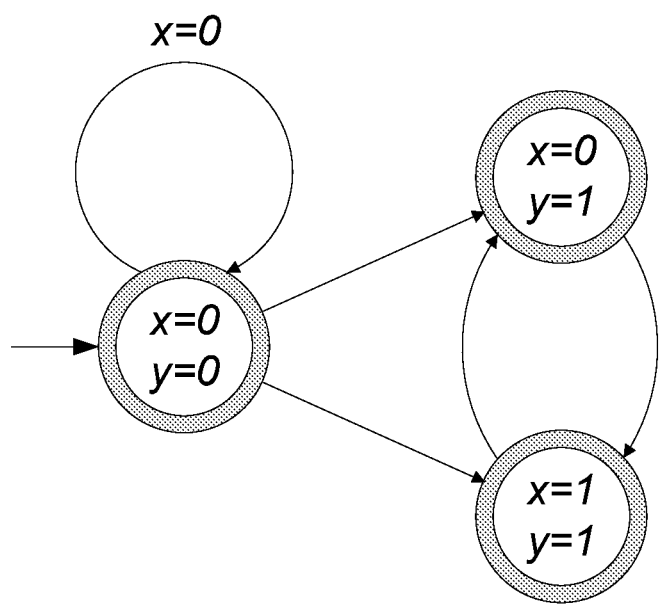
Figure 13C:
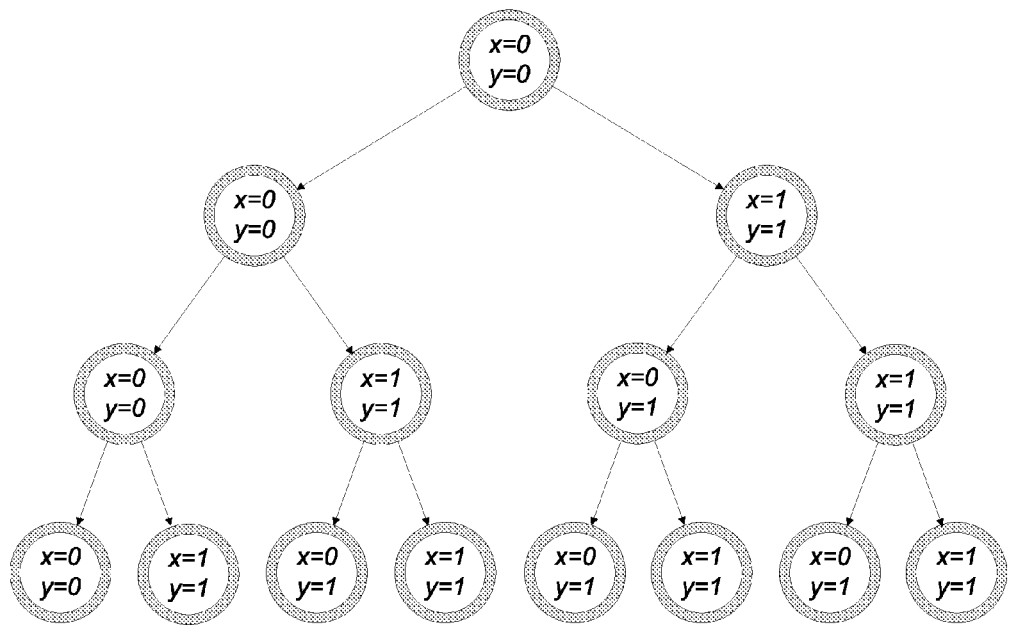

FIGS. 13*a*-13*c* demonstrates the mapping of a FSM representation into a parse tree representation. FIG. 13*a* shows an example of a two state FSM design. FIG. 13*b* shows the corresponding Kripke structure. Each state (indicated by a circle) in the Kripke structure is defined by both input (x) and the current state (y). Therefore in this example the Kripke structure represent up to four states while the FSM represents only two states. FIG. 13*c* depicts the parse tree for the given example. This representation facilitates the way to analyze the properties along the tree paths.

The formal analysis procedure is based on model checking for extracting the E-FFs in a given design, using the net-list as an input. First, the criteria are translated into assertions. In order to define assertions which express the appropriate criteria the procedure may utilize a Kripke structure. For this, the procedure may use the formal definition of a typical Kripke structure M=(K, T, I, L) where, K is the finite set of states, T⊆K×K is the total transition relation, I⊆K is the set of initial states and L: K→P(A) is the labeling function, where A is the set of atomic propositions, and P(A) denotes the power-set over A.

A set of atomic propositions (AP) is defined according to the required criteria, and then a check is made with respect to the validity of each flip flop in the design along the parse tree of the Kripke structure.

Preferably, the following APs are defined:

$AP_1$: The system is in standby state.

$AP_2$: The value of the flop under test is '0'.

$AP_3$: The value of the flop under test is '1'.

$AP_4$: $Y_M$ write event is detected.

$AP_5$: $Y_S$ read event is detected.

The above defined APs are used to implicitly express each of the proposed criteria. For example the Write Before Read criterion is expressed by $AP_4$ and $AP_5$, while $AP_2$ and $AP_3$ are used for expressing the Constant Value criterion.

The behavior of these APs is described in the Kripke parse tree representation using CTL (Computational Tree Logic) temporal logic equations. The CTL equations are used to define templates for creating the required assertions.

The proposed criteria for extracting the E-FF in a given circuit are related to the CTL equations. Therefore the CTL equations are built according to those criteria.

The procedure further translates the CTL equations into a property language, such as SVA (System Verilog Assertions), thus the assertions represent the proposed criteria. SVA is used by commercial model-checking tools, to check whether the property is satisfied or not.

The following discussion demonstrates the generation of the CTL equation for each criterion using the appropriate APs. The analysis is done for all the standby states upon entering standby and upon power resumption. The procedure defines a set of standby states $K_{sb}$ as follow: $K_{sb}=\{k_{sb_1}, k_{sb_2}, \ldots, k_{sb_n}\}$ where each $k_{sb_j}$ element is defined as a state which satisfies the atomic proposition $AP_1$.

The Constant Value Criterion: Each flip flop under test is examined to check if it adheres to this criterion. This criterion is expressed by $AP_2$ and $AP_3$. The following CTL equations which express this criterion are given below:

$$\xi_1 \triangleq [E(K_{sb}) \vDash AP_2]$$

$$\xi_2 \triangleq [E(K_{sb}) \vDash AP_3]$$

Assuming that one of the $k_{sb_j}$ standby states exists, i.e. $E(K_{sb})$, and it satisfies the atomic proposition $AP_2(\vDash AP_2)$, $\xi_1$ will be 'true'. Similarly, assuming $K_{sb}$ exists, and it satisfies $AP_3(\vDash AP_3)$, $\xi_2$ will be 'true'.

The following Table 1 is used to check if a flop adheres to the constant value criterion:

TABLE 1

| $\xi_1$ | $\xi_2$ | Type | Predefined value |
|---|---|---|---|
| pass | fail | N-FF | '0' |
| fail | pass | N-FF | '1' |
| pass | pass | E-FF | 'U' |
| fail | fail | ∅ | ∅ |

The combination of $\xi_1$ and $\xi_2$ is used to classify the flop as either E-FF or N-FF. For example flip flops that adhere both $\xi_1$ and $\xi_2$ are defined as E-FF.

For the N-FF a pre-defined value can be used upon power resumption. For example, in case $\xi_1$ is satisfied while $\xi_2$ is not satisfied (for all possible $k_{sb_j}$) the flop adhere to the criterion and always gets the value '0'.

The WBR criterion: Each master flip flop under test is examined to check if it adheres to this criterion. This criterion is expressed by $AP_4$ and $AP_5$. The following CTL equation which expresses this criterion is given below:

$$\xi_3 \triangleq [A(\pi^{k_{sb}}) \vDash -AP_5 U AP_4]$$

The meaning of the above CTL equation is as follows: assuming all possible paths emerging from standby state $A(\pi^{k_{sb}})$ satisfy the condition that no read event has been occurred ($-AP_5$) until a write event occurred (U $AP_4$), then $\xi_3$ is true. Therefore, the master flip flop under this test adheres to the 'write before read' criterion, and is classified as N-FF.

The following design example demonstrates an implementation of the formal verification approach of the present invention.

In this example a small design which consists of sequential and combinational logic is used. The design is translated into a Kripke structure representation, on which the constant criterion is examined. Then, the corresponding parse tree is generated and the write before read criterion is examined by checking all possible execution paths. Finally, the E-FFs are extracted.

Figure 14A:
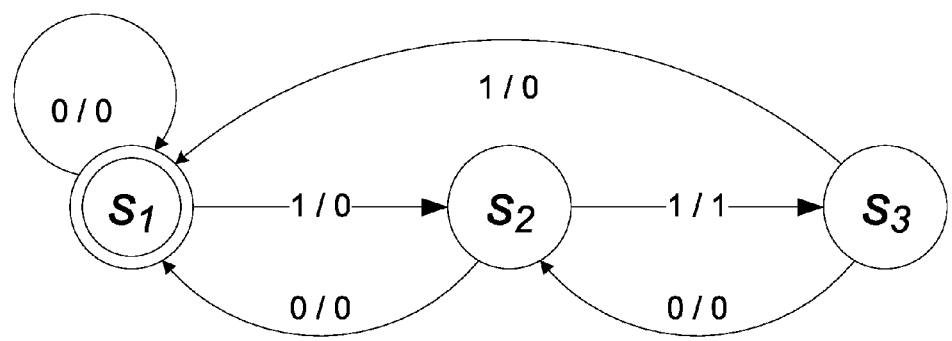
FIGS. 14a and 14b demonstrate a simple implementation of a pulse detection design.
Figure 14B:
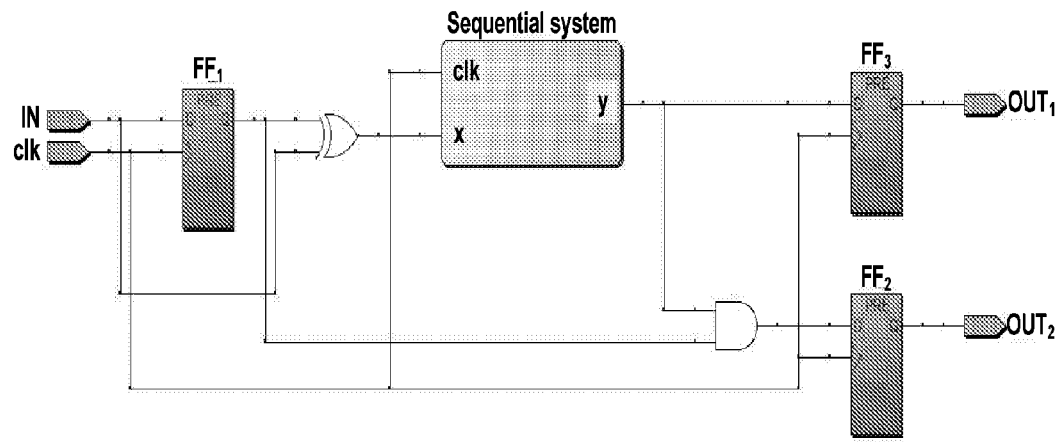

FIGS. 14a and 14b demonstrate a simple implementation of a pulse detection design. FIG. 14a describes the system state transition table, which consists of three states ($s_1$, $s_2$, $s_3$). FIG. 14b shows the design implementation, which consists of a sequential system (with input x and output y) and a sampling unit (including $FF_2$, $FF_3$). The input to the sequential system (x) is driven by $FF_1$, while its output (y) feeds the sampling unit. Whenever the serial input (IN) changes its polarity x will get the value '1' (and '0' otherwise), since $x=Q_1(t) \oplus Q_1(t-1)$. The sequential system behavior is described below:

1. The initial state $s_1$ is defined as the standby state.
2. In case the serial input (IN) changes its polarity a transition to $s_2$ occurs, otherwise the system remains in $s_1$.
3. In case the polarity is changed again, while in $s_2$, a transition to $s_3$ occurs, and a pulse is detected (y=1). Otherwise the system returns to the initial state $s_1$.
4. The $FF_3$ stores the event of a pulse detection, while $FF_2$ indicates the pulse polarity.

Figure 15:
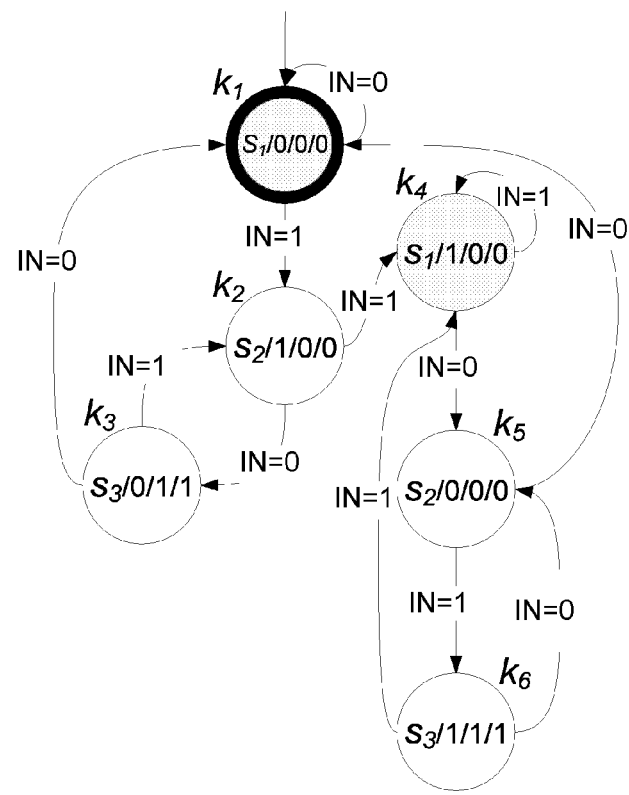
FIG. 15 shows a Kripke transition state according to an example of the invention.

The three flip flops ($FF_1$, $FF_2$, $FF_3$) are next checked for compliance with the constant value criterion. FIG. 15 shows the Kripke structure of the design example. Each state in the Kripke model ($k_j$) is indicated by a 4 elements vector ($s_1$/0/0/0), representing the system state and $FF_1$,$FF_2$,$FF_3$ respectively.

The validity of $AP_1$, $AP_2$ and $AP_3$ are checked for each flop on the Kripke transition states as shown in FIG. 15. The standby state $s_1$ is represented by two different states $k_1$ and $k_4$ in the Kripke structure, meaning $AP_1$ is true for $k_1$ and $k_4$.

The following Table 2 shows the results of the APs validity check:

TABLE 2

| State | FF1 | | | FF2 | | FF2 | |
|---|---|---|---|---|---|---|---|
| | AP1 | AP2 | AP3 | AP2 | AP3 | AP2 | AP3 |
| $k_1$ | True | True | False | True | False | True | False |
| $k_2$ | False | False | True | True | False | True | False |
| $k_3$ | False | True | False | False | True | False | True |
| $k_4$ | True | False | True | True | False | True | False |
| $k_5$ | False | True | False | True | False | True | False |
| $k_6$ | False | False | True | False | True | False | True |

For example, $FF_2$ satisfies $\xi_1$ ($AP_2$ is true, $FF_2$ is '0', for both $k_1$ and $k_4$) and does not satisfy $\xi_2$ ($AP_3$ is false, $FF_2$ is '0', for both $k_1$ and $k_4$). Therefore the conclusion according to Table 2 is that $FF_2$ adheres to the constant value criterion.

In order to check the write before read criterion, $FF_1$ is defined as the master flip flop, and $FF_2$ as its slave as shown in FIG. 14b. The output equation of the master $FF_1$ is given by $Q_1(t+1)=D_{in}$, and therefore $Q(t+1)$ is independent of $Q(t)$, meaning that $Y_m$ (write event) occurs at each clock. Therefore $AP_4$ is satisfied at every state, as shown in the following Table 3:

TABLE 3

| State | AP4 | AP5 |
|---|---|---|
| $k_1$ | True | False |
| $k_2$ | True | False |
| $k_3$ | True | True |
| $k_4$ | True | False |
| $k_5$ | True | False |
| $k_6$ | True | True |

Since $AP_5$ defines a read event occurrence, the slave flop $FF_2$ is examined. A read event is detected whenever the slave output $Q_2$ depends on the master $Q_1$. The slave output equation is given by $Q_2(t+1)=Q_1(t)*y$, therefore whenever y=1 a read event is detected ($Y_s$), meaning that the system is in $s_3$ state, i.e. $k_3$ and $k_6$ in the Kripke transition state of FIG. 15.

Figure 16:
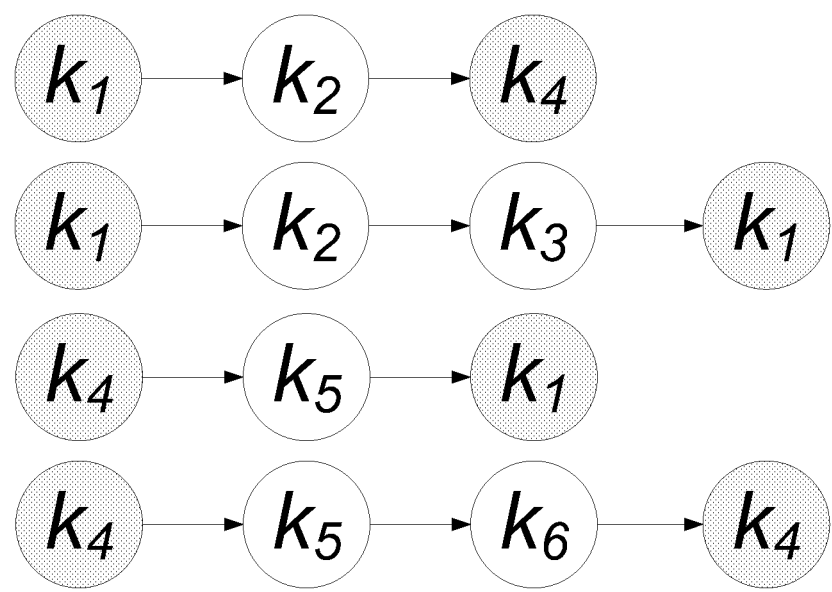
FIG. 16 shows all possible paths starting from a standby state and terminating at a standby state on a Kripke parse tree, according to one example.

FIG. 16 shows all possible paths starting from a standby state and terminating at a standby state on the Kripke parse tree. The property $\xi_3$ examines if $AP_5$ proceeds $AP_4$ in any of the paths of FIG. 16 to check if $k_3$ or $k_6$ occur before $Y_m$ (write event). Since in the current example $Y_m$ occurs both at $k_1$ and $k_4$ (actually it occurs at every state), i.e. before $k_3$ and $k_6$ a conclusion is made that $\xi_3$ is satisfied. Therefore $FF_1$ complies with the write before read criterion, and is classified as non-essential flip flop.

This above design provides a simple design case where the essential flip flops are easily extracted based on the proposed criteria. For larger designs, with thousands of flops, this task becomes relatively complicated and requires a practical and generic flow which is next described.

Figure 17:
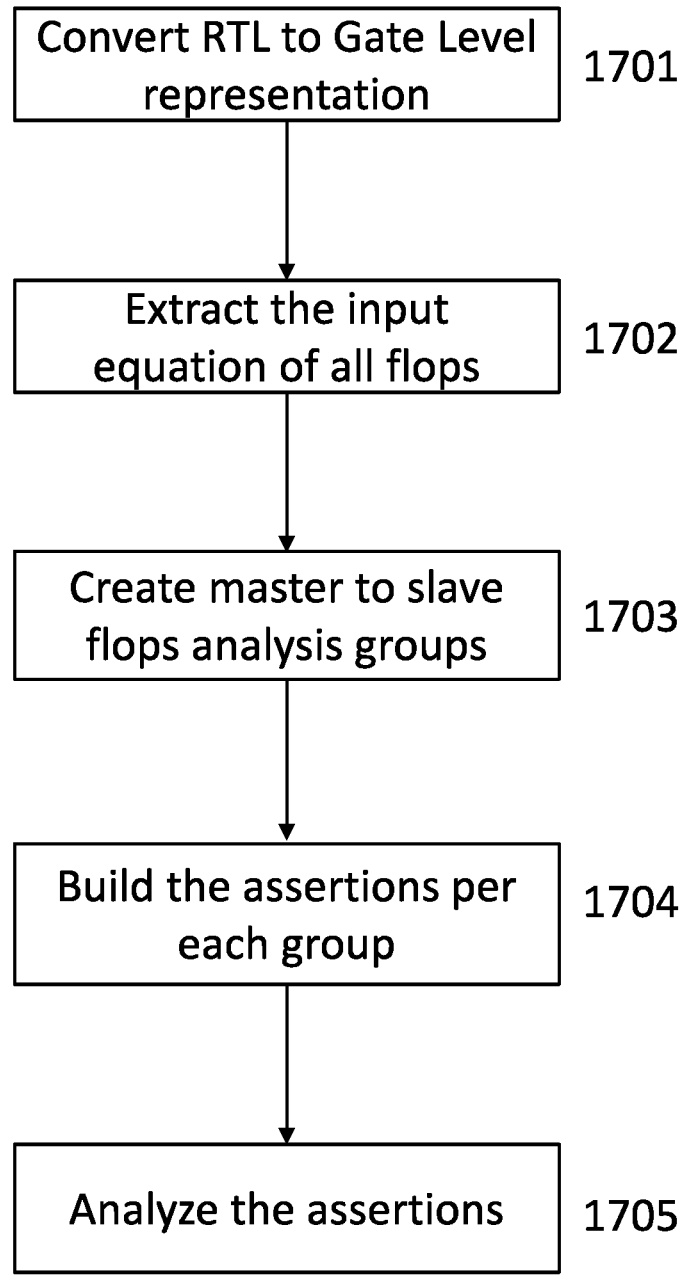
FIG. 17 is a flow for finding essential flip flops in a large design.

The following discussion provides a generic flow for extracting the essential flops in a large design. The proposed flow comprises five main steps as depicted in FIG. 17. First, in step 1701 the design's RTL representation is converted to a Gate-Level representation using universal logic gates. The conversion is carried out by applying a dedicated clock gate for each flip flop. In in step 1702 the input equation of each flop is recursively generated. Next, in step 1703 the design is partitioned to master-slave flip flop relations whereby a master flip flop drives one or more slave flip flops. Each master and its corresponding slaves are defined as an analysis group, characterized by a specific assertion, utilizing the write before read criterion. In step 1704, the assertions are built according to each criterion. For the constant value criterion, two assertions are generated for each flip flop (in compliance with $\xi_1$ and $\xi_2$). A general SVA form of those assertions is depicted by the SVA equation below:

property $xhi_1$ of $ff_1$: @(posedge CLOCK) disable if
$f$(RESET) $rose(IDLE)[→2]|→($Q_{ff}$==1'b0); end
property The meaning of this SVA equation is briefly explained as follows: the property labeled by "$xhi_1$ of $ff_1$" is triggered at every positive edge of the design CLOCK, excluding its RESET state. This property checks at every IDLE state (excluding the first occurrence), if $Q_{ff}$ is equal to '0'. The property gets a "fail" value if at least one of the checks results with a $Q_{ff}$=T. Otherwise, the property gets a "pass" value. The "$xhi_2$ of $ff_1$" property is defined in the same manner, except for testing whether $Q_{ff}$='1'.

For the write before read, an assertion is generated for each analysis group (in compliance with $\xi_3$). A general SVA form of this assertion is depicted by the following SVA equation:

property $xhi_3$ of $master_1$:

@($posedge$ CLOCK) disable $iff$(RESET)

$$\$rose(IDLE)[\to 2]$$

$$\to \left( !\begin{pmatrix} (slave_1 \text{ clock enable} == 1) \wedge ((D_{s_1}(Q_{m_1} = 0)) \oplus (D_{s_1}(Q_{m_1} = 1))) \\ \vee \\ (slave_2 \text{ clock enable} == 1) \wedge ((D_{s_2}(Q_{m_1} = 0)) \oplus (D_{s_2}(Q_{m_1} = 1))) \end{pmatrix} \right. \\ \text{throughout} \\ \left. (\#\#0(master_1 \text{ clock enable} == 1) \wedge ! ((D_{m_1}(Q_{m_1} = 0)) \oplus (D_{m_1}(Q_{m_1} = 1)))[\to 1]) \right);$$

end property

This SVA equation analyzes a group of a single master and two slaves. The property labeled by "$xhi_3$ of $master_1$" is defined by several test expressions. The test expressions are evaluated at the positive CLOCK edge of the design, excluding its RESET state. This property checks the "write before read" criterion at every exit from an IDLE state. All checks are done only when the clock gate enable signal is T. The first two expressions refer to a slave read event, and are continuously checked until a master write event occurs as described in the last expression.

To detect a read event, the dependency of the slave's input equation $D_{S_1}$ on the master $Q_{m_1}$ is checked. Therefore, if the assigning of '0' or '1' to $Q_{m_1}$ in $D_{S_1}$ results with a different value of $D_{S_1}$, it is concluded (using a $\oplus$ operation) that a read event has occurred. In the same manner $D_{S_2}$ is checked using the second expression.

To detect a write event the dependency of the master's input equation $D_{m_1}$ on its own output $Q_{m_1}$ is checked. Therefore, if assigning '0' or '1' to $Q_{m_1}$ in $D_{m_1}$ results with the same value, it is concluded (using a $\oplus$ operation) that a write event has occurred.

Finally, the generated assertions are validated by the model checker in step 1705. The constant value criterion requires a post processing of the $xhi_1$ and $xhi_2$ properties based on table 1 above.

Figure 18:
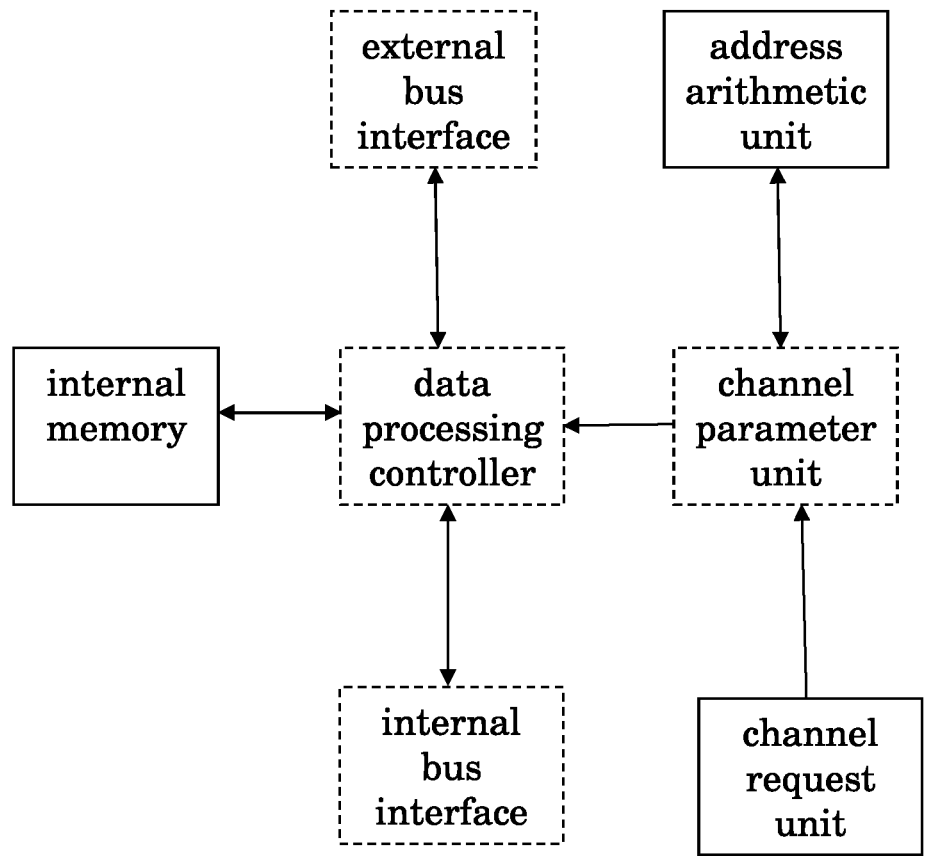
FIG. 18 shows a VLSI design which includes an arithmetic unit, data processing unit, bus arbiters, pipelines, buffers and memories, on which the method of the invention was tested.

The proposed approach has been applied to a typical design, representing an Image DMA Controller (IDMAC). The design includes an arithmetic unit, data processing unit, bus arbiters, pipelines, buffers and memories, as described in FIG. 18. The tested IDMAC contains 2759 flops not including memory instances.

The implementation flow previously described was applied to said IDMAC module. The number of assertions related to the constant value criterion is equal to 2759*2 which is twice the number of flip flops. The number of groups for the write before read criterion is derived from the number of the master flip flops, which is in turn equal to the total number of flip flops, excluding those flip flops that drive the external buses and external signals. Therefore, applying of the write before read criterion results in only 2322 assertion (out of 2759 flip flops). The total number of assertions is 7840. The required processing time for most of the assertions is less than 3 minutes, using IFV on Linux 64 bit, 4 GHz with 32 GB RAM. Therefore, the first run of the assertion analysis stage was performed on all the 7840 assertions with a processing time limitation of 3 minutes per assertion. This analysis in total can be obtained in less than 2 hours running in parallel 100 processes. For the cases in which the required processing time is longer than 3 minutes, a second iteration of the assertion analysis stage was applied with a limit of 10 minutes.

The formal analysis for the IDMAC results in 729 non-essential flip flops for the constant criterion, and 1966 for the write before read criterion. Since 381 flip flops adhere to both of said criteria, the total number of non-essential flops that have been detected was 2314. Therefore, a saving of 83.87% backup cells has been achieved compared to the conventional SRPG approach.

Table 4 describes in detail the number of essential and non-essential flip flops for each criteria:

TABLE 4

|  | Write before read criterion | Constant criterion | Combined |
| --- | --- | --- | --- |
| Number of flops | 2759 | 2322 | 2759 |
| Number of N-FF | 729 | 1966 | 2314 |
| Number of E-FF | 2030 | 356 | 445 |
| Saving percent | 26.42% | 84.67% | 83.87% |

B. Algorithm Approach

According to still another embodiment of the invention, the procedure for determining the non-essential flip flops can be performed by means of a so called "Algorithm approach". The following discussion describes this approach in more details.

The analysis stages for extracting the write before read and never read criteria are performed upon power resumption and are as follows:

a. The input equations for all the flip flops (the analyzed master FF and all its slaves) are extracted (see step 103 of FIG. 1). The general input equation is defined by:

$$D_w[n] = \sum_i Y_a[i]$$

The input equations are typically a function of the following variables: FSM state variables, design input control signals, and other FF outputs. Analysis of the FSM transitions determines the values of those variables.

b. Since the master flip flop drives n slaves flip flops, its output can be described as a set of equations:

$$R[n] = \begin{cases} \sum_j Y_b[j] \\ \sum_k Y_c[k] \\ \sum_l Y_d[l] \\ \ldots \\ \sum_p Y_m[p] \end{cases}$$

c. The procedure checks the dependency of the master FF input $D_w$ on its own output $Q_w$. If it is determined that the input value $D_w$ depends on the output $Q_w$, a write event to the master flip flop has not occurred. The case in which the flip flop is re-written with a value that depends on its previous value is not considered by the invention as a write event. On the other hand, if the input $D_w$ does not depend on its output $Q_w$, it is concluded that a write event has occurred.

d. The procedure continues in determining whether the master flip flop has been read. If it is determined that one of the output equations depends on the master own output $Q_w$, a conclusion is made that the master FF has been read.

e. In order to identify the "write before read" criteria, an analysis with respect to the order of events in the design FSM is performed. This analysis is performed for each state transition, whereby the cycle following each state transition is examined. There are four possible transactions in each cycle: (1) "write" transaction, which is detected in the analysis stage c above. (2) "read" transaction, which detected in stage d above. (3) both read and write transactions that are identified (according to the above steps) in the same cycle. (4) a case of neither read nor write is detected in the current cycle.

If a write transaction is detected before occurrence of any read event, then the flip flop adheres to the "write before read" criterion and the flip flop is defined as an N-FF. On the other hand, if a read event is detected in any of the slaves before occurrence of a write event, then this flip flop is defined as an E-FF. The case in which both read and write events are identified in the same cycle, does not meet the "write before read" criterion, and thus the flip flop under test is classified as an E-FF. If neither a read event nor a write event is detected after covering all the possible state transitions emerging from standby state, then this flip flop meets the "never read" criterion and is thus defined as an N-FF. By completing all the above steps, all the flip flops are classified as either essential or non-essential flip flops and the procedure has been completed.

In order to extract the essential flip flops from a given gate level representation of a design, a dedicated automatic algorithm is applied by this embodiment. The algorithm utilizes the above mentioned pre and post analysis (106 and 105 respectively), and is implemented using BDD structures (FIGS. 8, 9, and 10). The BDD structure is used as an efficient formal representation of the equations of the design. It has been found that the choice of such an efficient data structure has profound implications on the algorithm performance in terms of computational complexity and memory requirements. The above algorithm approach first extracts all of the input equations 103 for each flip flop in the design. Then, the extracted equations are transformed into appropriate BDD representation (steps 801, 901, and 1001) using Boole's Expansion Theorem:

$$f(x_1, x_2, \ldots, x_n) = x_1' \cdot f(0, x_2, \ldots, x_n) + x_1 \cdot f(1, x_2, \ldots, x_n)$$
$$= [x_1' + f(1, x_2, \ldots, x_n)] \cdot [x_1 + f(0, x_2, \ldots, x_n)],$$

For all $$(x_1, \ldots, x_n) \in B^n.$$

Where $f(x1, x2, \ldots xn)$ represents the examined input Boolean equation of the flip flop, and $x_1 \ldots x_n$ represents the input variables. Since the size of the BDD depends both on the Boolean equation and on the order of the variables, the BDD is constructed in a special manner, considering the order of the input variables, and utilizing the known initial conditions to facilitate the BDD traversal.

Each BDD represents a single flip flop input equation. Since each input equation may be a function of its own output, other flip flops outputs and the design inputs, each node in the BDD represents either a flip flop output or a design input. The flip flops connectivity is explicitly expressed in the BDD hierarchical structure. As mentioned before, the analysis is performed per state transition. For each flip flop in the design, the BDD is traversed starting at the root to check the pre (constant) and post (write before read, and never read) criteria. For each examined flip flop, the BDD own master input equation and the BDDs that represent the flip flops driven by it (slaves' inputs equations) are analyzed, i.e., all the BDDs that contain nodes that in turn represent the examined flip flop output are analyzed.

The "write before read" analysis is performed using two different steps, to detect write operation to the master and read operation from the master (by any one of its connected slaves). In order to check whether a flip flop was written, the procedure needs to analyze only the input equation of the master flip flop, i.e., its own BDD has to be analyzed (see FIG. 8). On the other hand, in order to check whether a flip flop is being read, the procedure needs to examine all the flip flops driven by it, i.e., all the BDDs containing that flip flop (see FIG. 9). The write analysis is performed as follows: The procedure first analyzes the BDD of the examined master flip flop in order to determine whether it was written (as defined previously). The BDD is traversed (step 802) using the initial conditions of the system in order to find whether the search terminates with a node containing its own Q-output. The initial conditions are derived from the standby state of the system which serves as a starting point for the analysis algorithm. In case that one of the BDD branches contains the Q output of the examined flip flop, then the procedure concludes that this flop was not written (step 804). In other words, this situation means that the written value depends on the output of the examined flip flop (which the procedure does not consider as a write). Otherwise the procedure considers the flip flop as being written (step 805).

The "read" analysis is performed in a similar manner by checking all the BDDs that contain the output of the examined flip flop. Each BDD is traversed (step 902) to find whether the search terminates with a node containing the Q-output of the examined master flip flop. In the case that one of the BDD branches contains the Q output of the examined flip flop, then the procedure conclude that this flip flop has been actually read (step 905). Otherwise, the procedure concludes that the master flip flop has not been read (904).

Using the above analysis, this embodiment of the invention can easily determine if the examined flip flop is ever read, thus adhering to the never read criteria.

The constant criterion is also analyzed by traversing the BDD of the examined flip flop (see FIG. 10). The BDD is traversed (step 1002) using the initial conditions of the system in order to explore the values of the leaves. If the search always terminates with leaves having the same value (step 1004), then the procedure concludes that this flip flop adheres to the constant criterion.

Otherwise, a conclusion is made that the flip flop does not meet the constant criterion (step 1005).

The proposed approach has been also applied to a similar IDMAC design larger than the one discussed above, comprising 3281 flip flops.

The analysis stages and their run time results are summarized by the following table 5:

TABLE 5

| Stage | Run Time [Hours] |
| --- | --- |
| Boolean equation extraction for each flip flop | 26 |
| BDD representation of each extracted equation | 32 |
| Criteria analysis for each flip flop | 194 |
| Total | 252 |

The analysis stages and their run time are summarized in the following table 6:

TABLE 6

|  | Write before Read Criterion | Constant Standby State Criterion |
|---|---|---|
| Number of Essential FF's | 735 | 2565 |
| Number of Redundant FF's | 2546 | 716 |
| SRPG Cell Saving factor | 77.6% | 21.8% |

The results depicted in table 6 show a significant saving factor of 77.6% compared to the traditional SRPG. This translates to a substantial reduction in both area and power consumption. The Area reduction is trivial due to the reduction of the number of SRPG cells that are about 30% larger in size than their associated Flip flops. The power reduction is very substantial in standby mode where the design needs to maintain power to only 22.4% of the SRPG cells compared to the conventional SRPG approach. The two proposed approaches have been successfully applied to a large VLSI design containing about 60,000 flip flops, demonstrating similar results with a saving factor of 80%.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. Method for reducing the number of flip-flops in a VLSI design that require data retention, thereby eliminating the respective backup cells for those flip flops, the method comprises the steps of:
   a. defining one or more criteria for non-essentiality of backup cells;
   b. during the physical design stage, analyzing the VLSI design based on said one or more criteria for non-essentiality, and finding those flip-flops that meet these criteria, wherein said analysis is performed at the gate level, independent from any higher level representation of the design; and
   c. eliminating from the VLSI design those backup cells for all non-essential flip-flops that meet one or more of said criteria for non-essentiality, thereby leaving in the design only those backup cells for those flip-flops that do not meet any of said criteria.

2. Method according to claim 1, wherein one of said criteria is a "write before read" criterion, defining a flip-flop on which, following recovery from a standby state, the first operation which is performed is a write operation assigning to the flip-flop a new value, given that this write operation takes place before any read operation is performed.

3. Method according to claim 2, wherein the write before read criterion is verified by:
   a. selecting a master-slave flip flop pair;
   b. monitoring said pair of flip flops immediately following power resumption and exiting from standby, to determine whether a master flip flop has been read by any one of the slaves that are driven by this master flip flop;
   c. if upon power resumption it is found that a master flip flop has been read by any one of the slaves that are driven by this master flip flop, before any write operation to the master flip flop is detected, a conclusion is made that the "write before read" criterion has not been met;
   d. if following an exit from standby state and upon power resumption, both said "write operation" and "read operation" have been detected, a conclusion is made that the "write before read", criterion has not been met; and
   e. if, however, a write to the master flip flop is detected before any read from the master flip flop by any one of its slaves is detected, a conclusion is made that the "write before read" criterion has been met.

4. Method according to claim 2, wherein said write operation is detected when finding that the cell is assigned a new value that is independent of the cell current value.

5. Method according to claim 2, which involves: (a) parsing the design into master slave groups, whereby each group comprises of one master flip flop and one or more slave flip flops driven by it; and (b) simplifying the "write before read" and "never read" criteria analysis.

6. Method according to claim 1, wherein one of said criteria is a "constant value" criterion, defining that upon entering a standby state a flip-flop always gets the same value.

7. Method according to claim 1, wherein one of said criteria is a "never read" criterion, defining that upon power resumption following recovery from a standby state, the respective flip-flop value is never read.

8. Method according to claim 1, wherein said analysis stage uses a Binary Decision Diagram representation to reduce computational complexity and memory requirements, and wherein said criteria for non-essentiality are mapped to BDD traversals.

9. Method according to claim 1, wherein said VLSI design is for use in a low-power mobile device.

10. Method according to claim 1, wherein the analysis stage involves parsing said design into groups of master-slave flip flops, whereby a master flip flop drives one or more slave flip-flops, and performing the analysis individually on each group, and independently from other groups.

11. Method according to claim 1, which comprises the steps of:
   a. producing a gate level representation of the VLSI design;
   b. parsing the design into groups of master-slave flip flops;
   c. extracting input equations for each flip flop in the design;
   d. analyzing said input equations with respect to a post-standby phase upon power resumption, with respect to a pre-standby phase upon power down, or with respect to both said phases, thereby finding those non-essential flip-flops that meet said one or more criteria for non-essentiality; and
   e. eliminating from the VLSI design those back up cells for all said non-essential flip-flops that meet one or more of said criteria for non-essentiality.

12. Method according to claim 11, wherein the analyzing step is performed either by use of a formal verification approach, or by use of an algorithmic based approach.

13. Method according to claim 12 wherein the formal verification approach applies a Bounded Model Checking technique, and wherein said criteria for non-essentiality are translated to assertions.

14. Method according to claim 13, wherein an analysis of said assertions by a Bounded Model Checking technique is simplified by employing clock-gating logic utilizing common synthesis tools.

15. Method according to claim 11, wherein the analysis with respect to a post standby phase analyzes all the pairs of master-slave flip flops in the design, and determines from said pairs those flip flops that adhere to said one or more of criteria for non-essentiality.

16. Method according to claim 15, wherein one master flip flop is common to plurality of said pairs.

17. Method according to claim 11, wherein the analysis with respect to a post standby phase determines those flip flops that meet either the "write before read" criterion or the "never read" criterion.

18. Method according to claim 11, wherein the analysis with respect to a pre standby phase determines those flip flops that meet the "constant value" criterion.

19. Method according to claim 11, wherein said stage of extracting the input equations uses common synthesis tools and limited specific standard cell library to generate a universal gate representation of the design.

20. Method according to claim 1 wherein said criteria comprise a "write before read", "never read" and "constant value" and said analysis is verified by:
   a. constructing a BDD graph from the respective input equation separately for each flip flop in the design;
   b. traversing the BDD based on initial standby state values known in advance for the respective flip flop;
   c. for said "constant value" criterion, checking all the sub branches of the BDD to verify whether all their leaves contain the same value, and in the affirmative case, defining the flip flop as a non-essential flip flop;
   d. for said "write before read" criterion, checking the following condition for all the sub branches: (1) if the BDD graph traversal for a master flip-flop ends with a branch not containing its own master flip-flop output value with no dependency on its own output, concluding that a write operation is detected; and (2) if the BDD graph traversal for all slave flip-flops ends with a branch not containing the master flip-flop output, concluding that no read operation is detected; and (3) when both said conditions are met, a 'write before read" has occurred and therefore concluding that the master flip flop is a non-essential flip flop;
   e. for said "never read" criterion, checking the following condition for all the sub branches: (1) if the BDD graph traversal for all slave flip-flops ends with a branch not containing the master flip-flop own output, for all following cycles exiting standby, concluding that no read operation is detected and, concluding that the flip flop is a non-essential flip flop;
   f. if the examined flip-flop does not adhere to any of said criteria, concluding that the flip flop is an essential flip flop; and
   g. repeating steps a-f separately for all the flip flops in the design, thereby classifying all the flip-flops in the design to either essential or non-essential flip-flops.

21. Method according to claim 1, which is generic and irrespective of the VLSI specific design.

* * * * *